(12) United States Patent  (10) Patent No.: US 8,714,724 B2
Mayo et al.  (45) Date of Patent: May 6, 2014

(54) PHASE CHANGE INKS CONTAINING NOVEL SYNERGIST

(71) Applicant: Xerox Corporation, Norwalk, CT (US)

(72) Inventors: James D. Mayo, Mississauga (CA); C. Geoffrey Allen, Waterdown (CA); Salma Falah Toosi, Mississauga (CA); Mihaela Maria Birau, Mississauga (CA); Caroline Turek, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/633,608

(22) Filed: Oct. 2, 2012

(65) Prior Publication Data

US 2014/0092182 A1  Apr. 3, 2014

(51) Int. Cl.
*G01D 11/00* (2006.01)

(52) U.S. Cl.
USPC .......................................................... 347/99

(58) Field of Classification Search
USPC ........ 347/44, 88, 95, 96, 99–101; 522/42, 84, 522/85; 523/160, 161; 106/31.6, 31.13, 106/31.27, 31.78
See application file for complete search history.

(56) References Cited

U.S. PATENT DOCUMENTS

| | | | |
|---|---|---|---|
| 3,653,932 A | 4/1972 | Berry et al. | |
| 4,251,824 A | 2/1981 | Hara et al. | |
| 4,390,369 A | 6/1983 | Merritt et al. | |
| 4,410,899 A | 10/1983 | Haruta et al. | |
| 4,412,224 A | 10/1983 | Sugitani | |
| 4,484,948 A | 11/1984 | Merritt et al. | |
| 4,490,731 A | 12/1984 | Vaught | |
| 4,532,530 A | 7/1985 | Hawkins | |
| 4,601,777 A | 7/1986 | Hawkins et al. | |
| 4,684,956 A | 8/1987 | Ball | |
| 4,830,671 A | 5/1989 | Frihart et al. | |
| 4,851,045 A | 7/1989 | Taniguchi | |
| 4,889,560 A | 12/1989 | Jaeger et al. | |
| 4,889,761 A | 12/1989 | Titterington et al. | |
| 5,006,170 A | 4/1991 | Schwarz et al. | |
| 5,151,120 A | 9/1992 | You et al. | |
| 5,194,638 A | 3/1993 | Frihart et al. | |
| 5,195,430 A | 3/1993 | Rise | |
| 5,221,335 A | 6/1993 | Williams et al. | |
| 5,372,852 A | 12/1994 | Titterington et al. | |
| 5,389,958 A | 2/1995 | Bui et al. | |
| 5,496,879 A | 3/1996 | Griebel et al. | |
| 5,597,856 A | 1/1997 | Yu et al. | |
| 5,750,604 A | 5/1998 | Banning et al. | |

(Continued)

FOREIGN PATENT DOCUMENTS

EP  206286  12/1986
GB  2238792  6/1991

(Continued)

OTHER PUBLICATIONS

James D. Mayo, et al., U.S. Appl. No. 13/633,596, filed Oct. 2, 2012, "Phase Change Ink Containing Synergist for Pigment Dispersion," not yet published, 57 pages, 6 drawing sheets.

*Primary Examiner* — Kristal Feggins
(74) *Attorney, Agent, or Firm* — Marylou J. Lavoie

(57) ABSTRACT

A phase change ink composition including a pigment; a carrier; a dispersant; and a copper phthalocyanine synergist having a carboxylic acid group thereon.

16 Claims, 2 Drawing Sheets

(56) References Cited

U.S. PATENT DOCUMENTS

| | | | |
|---|---|---|---|
| 5,780,528 | A | 7/1998 | Titterington et al. |
| 5,782,966 | A | 7/1998 | Bui et al. |
| 5,783,658 | A | 7/1998 | Banning et al. |
| 5,827,198 | A | 10/1998 | Kassal |
| 5,830,942 | A | 11/1998 | King et al. |
| 5,919,839 | A | 7/1999 | Titterington et al. |
| 6,174,937 | B1 | 1/2001 | Banning et al. |
| 6,221,137 | B1 | 4/2001 | King et al. |
| 6,255,432 | B1 | 7/2001 | Evans et al. |
| 6,309,453 | B1 | 10/2001 | Banning et al. |
| 6,472,523 | B1 | 10/2002 | Banning et al. |
| 6,476,219 | B1 | 11/2002 | Duff et al. |
| 6,547,380 | B2 | 4/2003 | Smith et al. |
| 6,576,747 | B1 | 6/2003 | Carlini et al. |
| 6,576,748 | B1 | 6/2003 | Carlini et al. |
| 6,590,082 | B1 | 7/2003 | Banning et al. |
| 6,646,111 | B1 | 11/2003 | Carlini et al. |
| 6,663,703 | B1 | 12/2003 | Wu et al. |
| 6,673,139 | B1 | 1/2004 | Wu et al. |
| 6,696,552 | B2 | 2/2004 | Mayo et al. |
| 6,713,614 | B2 | 3/2004 | Carlini et al. |
| 6,726,755 | B2 | 4/2004 | Titterington et al. |
| 6,755,902 | B2 | 6/2004 | Banning et al. |
| 6,821,327 | B2 | 11/2004 | Jaeger et al. |
| 6,858,070 | B1 | 2/2005 | Wong et al. |
| 6,860,930 | B2 | 3/2005 | Wu et al. |
| 6,906,118 | B2 | 6/2005 | Goodbrand et al. |
| 6,958,406 | B2 | 10/2005 | Banning et al. |
| 7,053,227 | B2 | 5/2006 | Jaeger et al. |
| 7,381,831 | B1 | 6/2008 | Banning et al. |
| 7,407,539 | B2 | 8/2008 | Wu et al. |
| 7,427,323 | B1 | 9/2008 | Birau et al. |
| 7,780,774 | B2 | 8/2010 | Wong et al. |
| 7,973,186 | B1 | 7/2011 | Goredema et al. |
| 2002/0065335 | A1* | 5/2002 | Noguchi et al. ............ 522/84 |
| 2011/0152397 | A1* | 6/2011 | Breton et al. ............ 522/42 |

FOREIGN PATENT DOCUMENTS

| | | |
|---|---|---|
| GB | 2290793 | 1/1996 |
| GB | 2294939 | 5/1996 |
| GB | 2305670 | 4/1997 |
| GB | 2305928 | 4/1997 |
| WO | WO 94/04619 | 3/1994 |
| WO | WO 94/14902 | 7/1994 |
| WO | WO 95/04760 | 2/1995 |
| WO | WO 96/14364 | 5/1995 |
| WO | WO 97/12003 | 4/1997 |
| WO | WO 97/13816 | 4/1997 |
| WO | WO 9733943 | 9/1997 |

* cited by examiner

PHASE CHANGE INKS CONTAINING NOVEL SYNERGIST

Commonly assigned U.S. patent application Ser. No. 13/633,596, entitled "Phase Change Ink Containing Synergist For Pigment Dispersion", filed concurrently herewith, which is hereby incorporated by reference herein in its entirety, describes phase change inks comprising a pigment; a carrier; a dispersant; and a synergist, (a) wherein, for a given sample of the synergist, about 80 to about 100 percent of the sample has a volume average particle diameter of about 50 to about 200 nanometers; (b) wherein the synergist has a surface area of about 30 to about 100 m$^2$/gram; and (c) wherein the synergist has a density of above about 0.6 to about 2 grams/milliliter.

BACKGROUND

Disclosed herein is a novel synergist for phase change ink compositions, more particularly, a copper phthalocyanine synergist having a carboxylic acid group thereon.

In general, phase change inks (sometimes referred to as solid inks or "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes.

The colorants can also include pigments, as disclosed in, for example, U.S. Pat. No. 5,221,335, the disclosure of which is totally incorporated herein by reference.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Ink jetting devices are known in the art, and thus extensive description of such devices is not required herein. As described in U.S. Pat. No. 6,547,380, which is hereby incorporated herein by reference in its entirety, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, which is hereby incorporated herein by reference in its entirety, the image is applied by jetting appropriately colored inks during four to eighteen rotations (incremental movements) of a substrate (an image receiving member or intermediate transfer member) with respect to the ink jetting head, i.e., there is a small translation of the print head with respect to the substrate in between each rotation. This approach simplifies the print head design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Thermal ink jet processes are well known and are described, for example, in U.S. Pat. Nos. 4,601,777, 4,251,824, 4,410,899, 4,412,224 and 4,532,530, the disclosures of each of which are hereby incorporated herein.

As noted, ink jet printing processes may employ inks that are solid at room temperature and liquid at elevated temperatures. For example, U.S. Pat. No. 4,490,731, which is hereby incorporated by reference herein, discloses an apparatus for dispensing solid ink for printing on a substrate such as paper. In thermal ink jet printing processes employing hot melt inks, the solid ink is melted by the heater in the printing apparatus and utilized (i.e., jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of non-printing without the danger of nozzle clogging, even without capping the nozzles.

Examples of the phase change inks herein are inks that include an ink vehicle that is solid at temperatures of about 23° C. to about 27° C., for example room temperature, and specifically are solid at temperatures below about 60° C. However, the inks change phase upon heating, and are in a molten state at jetting temperatures. Thus, the inks have a viscosity of from about 1 to about 20 centipoise (cp), for example from about 5 to about 15 cp or from about 8 to about 12 cp, at an elevated temperature suitable for ink jet printing, for example temperatures of from about 60° C. to about 150° C.

In this regard, the inks herein may be either low energy inks or high energy inks. Low energy inks are solid at a temperature below about 40° C. and have a viscosity of from about 1 to about 20 centipoise such as from about 5 to about 15 centipoise, for example from about 8 to about 12 cp, at a jetting temperature of from about 60° C. to about 100° C. such as about 80° C. to about 100° C., for example from about 90° C. to about 100° C. High energy inks are solid at a temperature below about 40° C. and have a viscosity of from about 5 to about 15 centipoise at a jetting temperature of from about 100° C. to about 180° C., for example from 120° C. to about 160° C. or from about 125° C. to about 150° C.

While certain colorants suitable for use in phase change inks are known, an increase in the range of colorants suitable for use in phase change inks is desirable. Current phase change inks often comprise custom dye colorants. These custom dyes are very expensive. It is desired to replace custom dye colorants with less expensive colorants. Pigments are typically much less expensive than dye colorants. In addition, pigments can offer improved colorfastness over dyes, reduce or eliminate migration issues, and improve ink robustness characteristics.

Pigmented phase change ink compositions that include various dispersants are also known. However, the use of certain polymeric dispersants can be disfavored in some phase change inks for a variety of reasons. The problems caused by the use of certain polymeric dispersants include a negative effect on rheological properties of the ink, such as non-Newtonian behavior and an increase in viscosity.

Pigment particles in the ink must be properly dispersed and stabilized such that the ink can be reliably jetted without the clogging of the print heads by the pigment particles. Polymeric dispersants in phase change inks can affect drop formation, because polymers will tend to form filaments which affect the formation of small drop sizes. Most of the commercially available dispersants were designed for aqueous based and solvent based ink systems and are not compatible with hydrophobic wax based inks. Many of the commercially available compounds that can effect dispersion of pigments in low polarity inks (usually solvent-based) are liquids or pastes and are not designed to chemically withstand the excessive temperatures in the printer (over 100° C., typically 115° C. to 120° C.) for long periods of time. Furthermore, the use of polymers in solid ink can be disfavored for the following reasons: a) they can have a negative impact on rheological properties producing non-Newtonian behavior and an increase in viscosity, and b) they can affect drop formation during jetting, polymers will tend to form filaments which might affect the formation of small drop sizes.

Dispersion of pigments in solid ink formulations can be particularly difficult owing to the high temperatures incurred in the printer (such as greater than 100° C.), the potential for multiple freeze-thaw cycles the ink might undergo, and the non-polar nature of the ink vehicle.

U.S. Pat. No. 7,780,774, of Raymond W. Wong, et al., which is hereby incorporated by reference herein in its entirety, describes in the Abstract thereof a method of making a phase change ink composition includes adding to a device with a stirring element at least one pigment, at least one dispersant and at least one synergist, processing the device at an elevated temperature and at a stirring rate to wet the at least one pigment to obtain an ink concentrate, and mixing the ink concentrate with an ink vehicle to obtain the ink composition. The device may be an extruder, an attritor or the like. The method allows for the reduction in the amount of dispersant to include in the ink.

While known compositions and processes are suitable for their intended purposes, a need remains for improved phase change ink compositions. There is further a need for an improved colored phase change ink composition where the pigment particles are stable and well dispersed in the ink. There is further a need for phase change ink compositions including improved synergists that are chemically stable, compatible with the phase change ink formulation and that can provide stabilization of pigment particles in phase change inks over long periods of time at high temperatures. There remains a need for pigmented phase change inks with improved image quality, improved light fastness, and reduced show through. A need also remains for pigmented phase change inks where the colorants have reduced agglomeration and settling in the ink when the ink is exposed to high temperatures for prolonged periods. A need also remains for pigmented phase change inks with reduced clogging of the jets in the print head. There further remains a need for pigmented phase change ink compositions where dispersion of pigments in the solid ink compositions is stable under high temperature conditions incurred in the printer (such as greater than 100° C.), that is stable throughout multiple freeze-thaw cycles the ink can undergo, and that is compatible and stable in the non-polar ink vehicle.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a copper phthalocyanine synergist having a carboxylic acid group thereon.

Also described is a copper phthalocyanine synergist having the formula

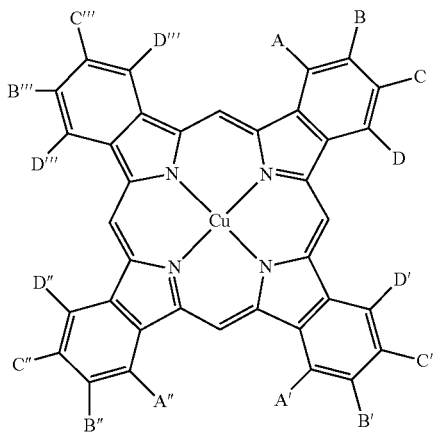

wherein each of A, B, C, and D, A', B', C', and D', A", B", C", and D", A''', B''', C''', and D''' are optionally present, provided that at least one of A, B, C, D, A', B', C', D', A", B", C", D", A''', B''', C''', and D''' is —COOH or R—COOH, and wherein each of A, B, C, and D, A', B', C', and D', A", B", C", and D", A''', B''', C''', and D''' are independently selected from the group consisting of hydrogen, —COOH and R—COOH wherein R is (i) an alkyl group, which can be linear or branched, saturated or unsaturated, cyclic or acyclic, substituted or unsubstituted alkyl, and wherein hetero atoms may optionally be present in the alky group, (ii) an aryl group, which can be substituted or unsubstituted aryl, and wherein hetero atoms may optionally be present in the aryl group, (iii) an arylalkyl group, which can be substituted or unsubstituted arylalkyl, wherein the alkyl portion of the arylalkyl can be linear or branched, saturated or unsaturated, cyclic or acyclic, and substituted or unsubstituted, and wherein hetero atoms may optionally be present in either the aryl portion or the alkyl portion of the arylalkyl, (iv) an alkylaryl group, which can be substituted or unsubstituted alkylaryl, wherein the alkyl portion of the alkylaryl can be linear or branched, saturated or unsaturated, cyclic or acyclic, and substituted or unsubstituted, and wherein hetero atoms may optionally be present in either the alkyl portion or the aryl portion of the alkylaryl group.

In embodiments, at least one of each set of A, B, C, and D, A', B', C', and D', A", B", C", and D", A''', B''', C''', and D''', are of the formula

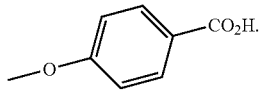

Also described is a phase change ink composition comprising a pigment; a carrier; a dispersant; and a copper phthalocyanine synergist having a carboxylic acid group thereon.

Also described is a method for preparing a phase change ink composition comprising combining a pigment, a carrier; a dispersant; and a copper phthalocyanine synergist having a carboxylic acid group thereon, to produce a phase change ink composition.

Also described is a method comprising incorporating into an ink jet printing apparatus a phase change ink composition comprising a pigment, a carrier; a dispersant; and a copper phthalocyanine synergist having a carboxylic acid group thereon; melting the ink composition; and causing droplets of the melted ink to be ejected in an imagewise pattern onto a substrate.

Also described is an ink jet printer stick or pellet containing a phase change ink composition comprising a pigment, a carrier; a dispersant; and a copper phthalocyanine synergist having a carboxylic acid group thereon.

DETAILED DESCRIPTION

Figure 1:
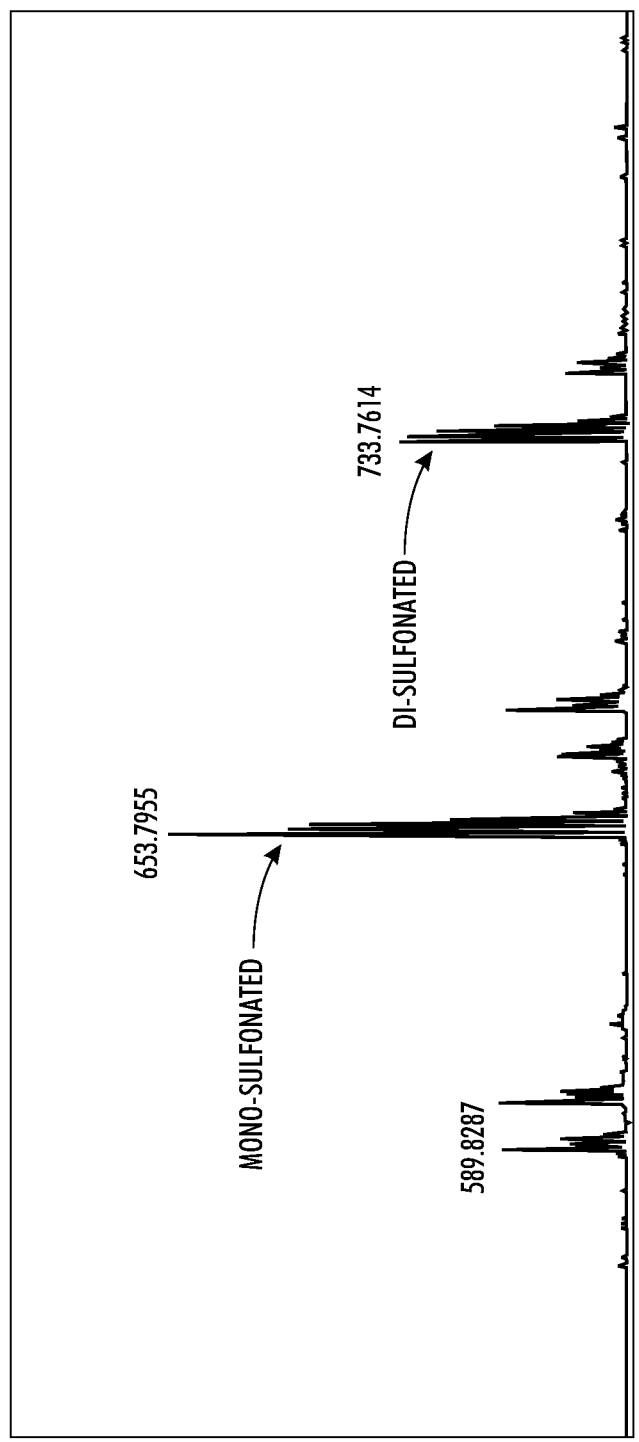
FIG. 1 is a graph showing a MALDI-TOF analysis of a commercially available synergist.
Figure 2:
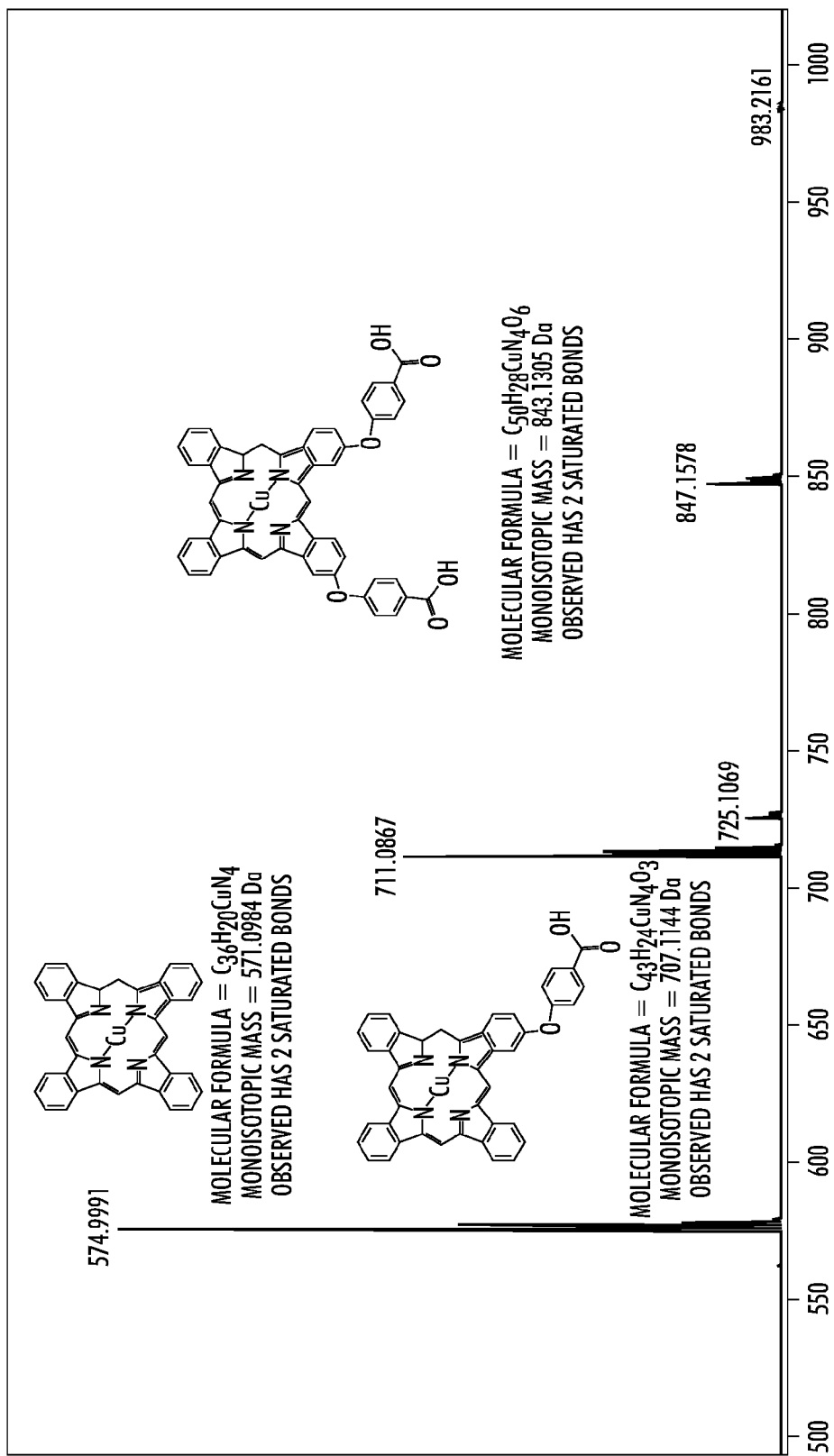
FIG. 2 is a graph showing a MALDI-TOF analysis of a novel synergist in accordance with the present disclosure.

The present disclosure provides a novel synergist which, in embodiments, can be coupled with an appropriate dispersant to significantly improve dispersion stability. Previously available synergists have been limited. Certain known synergists are based on the sulfonated salt of a suitable pigment, which acts to anchor to the base pigment, and in turn provide anchoring sites for the dispersant.

Phthalocyanines form large networks or aggregates by means of pi-stacking. Interruption of this pi-stacked network with a substituted phthalocyanine synergist minimizes the size of the aggregates and enables bonding of amine based dispersants or polyethylene imines allowing for greater stability of the ink.

In embodiments, a novel synergist is provided comprising a modified copper phthalocyanine having a carboxylic acid moiety attached to the pigment. The present novel carboxylated copper phthalocyanines are particularly suitable for use as synergists for dispersing copper phthalocyanine pigments in solid inks.

In embodiments, counter ions having long alkyl chains can be selected to enhance the compatibility of the normally insoluble phthalocyanine in the non-polar solid ink vehicle.

Without wishing to be bound by theory, it is believed that the use of an acid group enables covalent bonding between the synergist and dispersant. The carboxylic acid group is believed to enable a more thermally stable covalent linkage between synergist and dispersant resulting in improved stability of the phase change inks.

In embodiments, the novel copper phthalocyanine synergist herein is of the formula

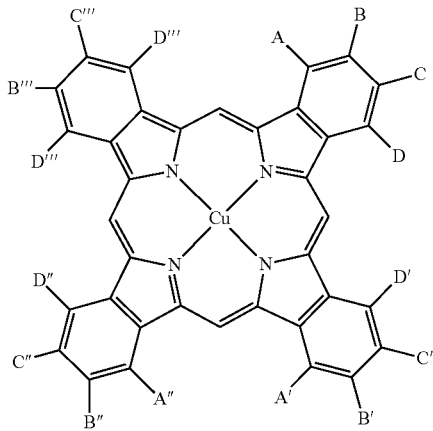

wherein each of A, B, C, and D, A', B', C', and D', A", B", C", and D", A''', B''', C''', and D''' are optionally present, provided that at least one of A, B, C, D, A', B', C', D', A", B", C", D", A''', B''', C''', and D''' is —COOH or R—COOH, and wherein each of A, B, C, and D, A', B', C', and D', A", B", C", and D", A''', B''', C''', and D''' are independently selected from the group consisting of hydrogen, —COOH and R—COOH wherein R is (i) an alkyl group, which can be linear or branched, saturated or unsaturated, cyclic or acyclic, substituted or unsubstituted alkyl, and wherein hetero atoms may optionally be present in the alky group, (ii) an aryl group, which can be substituted or unsubstituted aryl, and wherein hetero atoms may optionally be present in the aryl group, (iii) an arylalkyl group, which can be substituted or unsubstituted arylalkyl, wherein the alkyl portion of the arylalkyl can be linear or branched, saturated or unsaturated, cyclic or acyclic, and substituted or unsubstituted, and wherein hetero atoms may optionally be present in either the aryl portion or the alkyl portion of the arylalkyl, (iv) an alkylaryl group, which can be substituted or unsubstituted alkylaryl, wherein the alkyl portion of the alkylaryl can be linear or branched, saturated or unsaturated, cyclic or acyclic, and substituted or unsubstituted, and wherein hetero atoms may optionally be present in either the alkyl portion or the aryl portion of the alkylaryl group.

In embodiments, at least one of each set of A, B, C, and D, A', B', C', and D', A", B", C", and D", A''', B''', C''', and D''', are of the formula

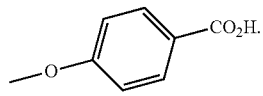

In embodiments, the novel synergist herein is a copper phthalocyanine synergist having the formula

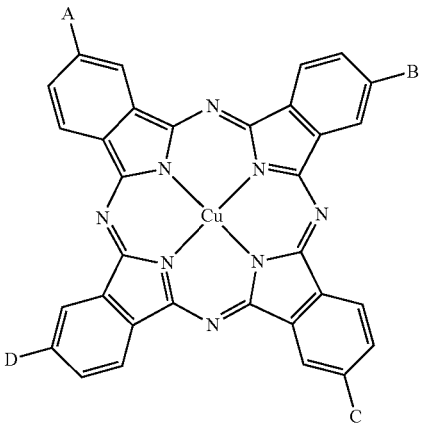

wherein A, B, C, and D are optionally present, provided that at least one of A, B, C, and D are present, and wherein each of A, B, C, and D are independently selected (that is, each of A, B, C, and D can be the same or different from one another) from the group consisting of —COOH; R—COOH wherein R is (i) an alkyl group and wherein the alkyl group can be linear, branched, saturated, unsaturated, cyclic, acyclic, substituted, or unsubstituted, and wherein heteroatoms, such as oxygen, nitrogen, sulfur, silicon, phosphorus, boron, and the like may optionally be present in the alkyl group), having from about 1 to about 100 carbon atoms, or from about 1 to about 50 carbon atoms, or from about 1 to about 12 carbon atoms, although the number of carbon atoms can be outside of these ranges, (ii) an aryl group, wherein the alkyl group can be substituted, or unsubstituted, and wherein heteroatoms, such as oxygen, nitrogen, sulfur, silicon, phosphorus, boron, and the like may optionally be present in the aryl group), having from about 5 to about 100 carbon atoms, or from about 5 to about 50 carbon atoms, or from about 5 to about 12 carbon atoms, although the number of carbon atoms can be outside of these ranges, (iii) an arylalkyl group, which can be substituted or unsubstituted arylalkyl, wherein the alkyl portion of the arylalkyl can be linear or branched, saturated or unsaturated, cyclic or acyclic, and substituted or unsubstituted, and wherein hetero atoms such as oxygen, nitrogen, sulfur, silicon, phosphorus, boron, and the like, may optionally be present in either the aryl portion or the alkyl portion of the arylalkyl, in embodiments, having from about 5 to about 100 carbon atoms, or from about 5 to about 50 carbon atoms, although the numbers can be outside of these ranges, and (iv) an alkylaryl group, which can be substituted or unsubstituted alkylaryl, wherein the alkyl portion of the alkylaryl can be linear or branched, saturated or unsaturated, cyclic or acyclic, and substituted or unsubstituted, and wherein hetero atoms such as oxygen, nitrogen, sulfur, silicon, phosphorus, boron, and the like, may optionally be present in either the aryl portion or the alkyl portion of the alkylaryl, in embodiments, having from about 5 to about 100 carbon atoms, or from about 5 to about 50 carbon atoms, although the numbers can be outside of these ranges.

In embodiments, the novel synergist herein is a compound of the formula

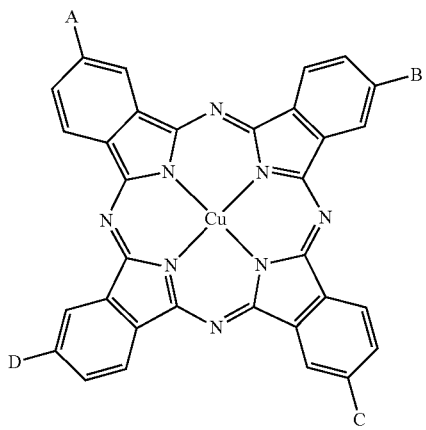

wherein A, B, C, and D are optionally present, provided that at least one of A, B, C, and D are present, and wherein A, B, C, and D are of the formula

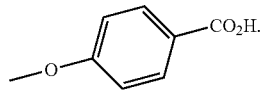

In embodiments, the novel synergist herein is a compound of the formula

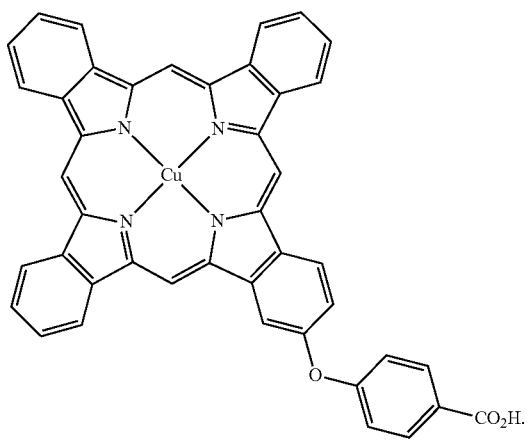

In embodiments, the novel synergist herein is a compound of the formula

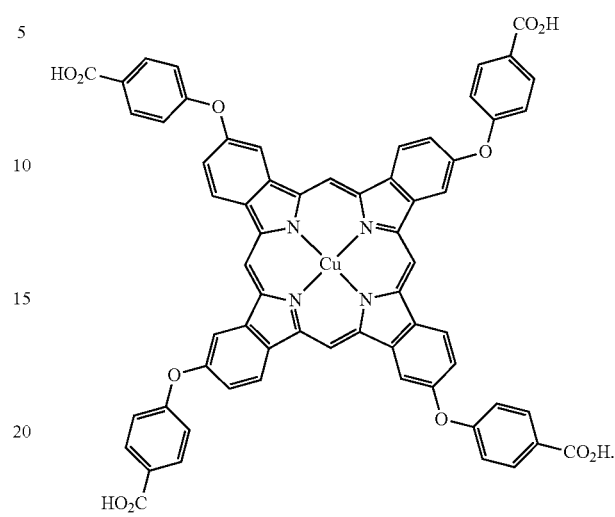

In embodiments, the novel synergist herein is a compound of the formula

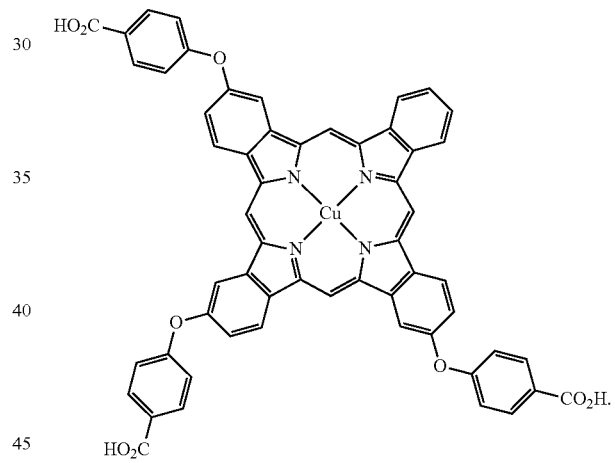

In embodiments, the novel synergist herein is a compound of the formula

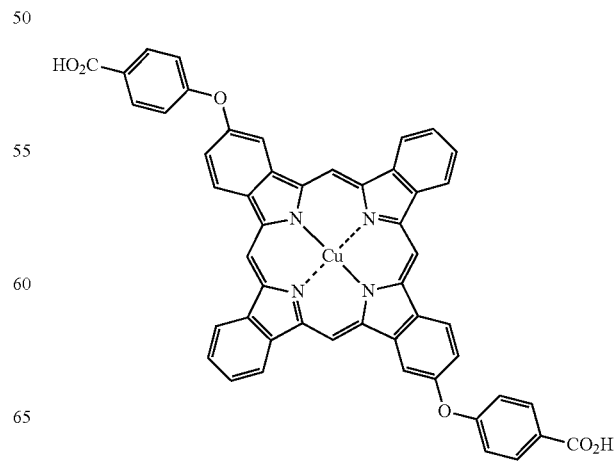

The novel synergist herein can be prepared by any suitable or desired method. In embodiments, tetra-substituted carboxylated phthalocyanines can be prepared via the following reaction scheme:
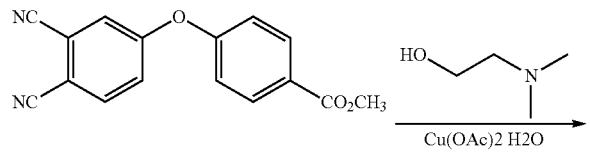
4
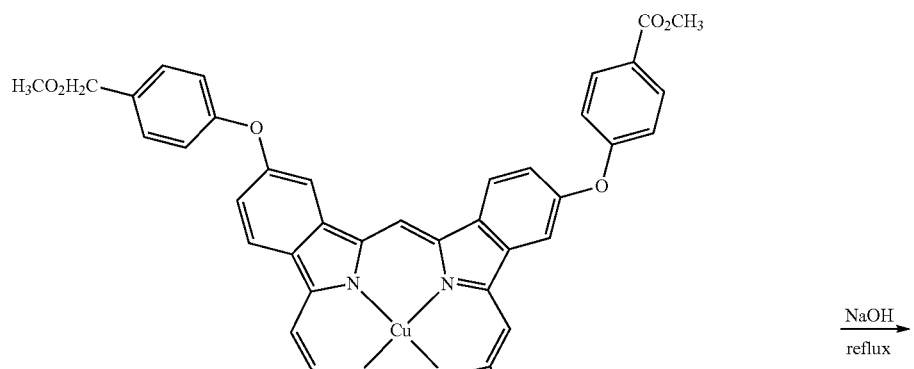
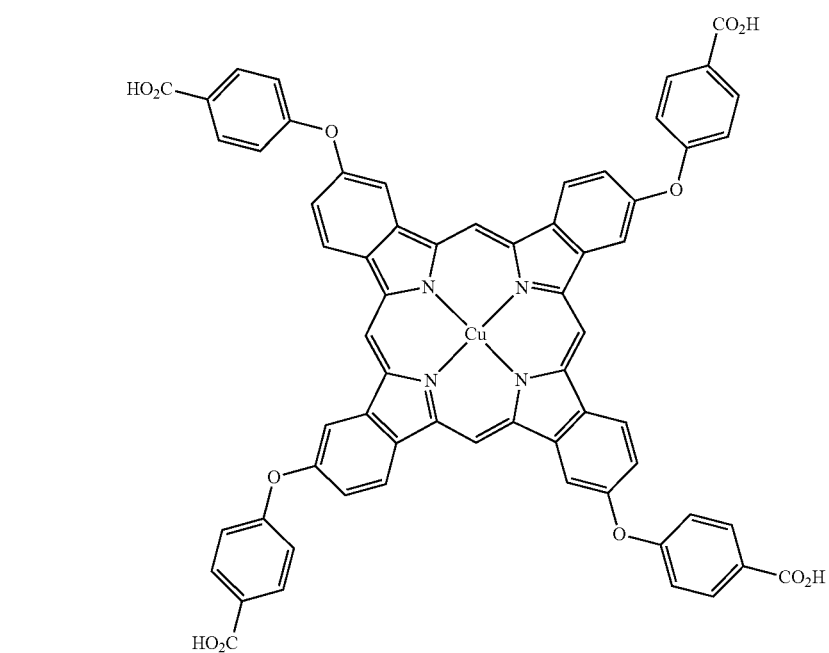

In certain embodiments, a modified copper phthalocyanine synergist comprising a single substituent is provided. In embodiments, mono-substituted carboxylated phthalocyanines can be prepared via the following reaction scheme.

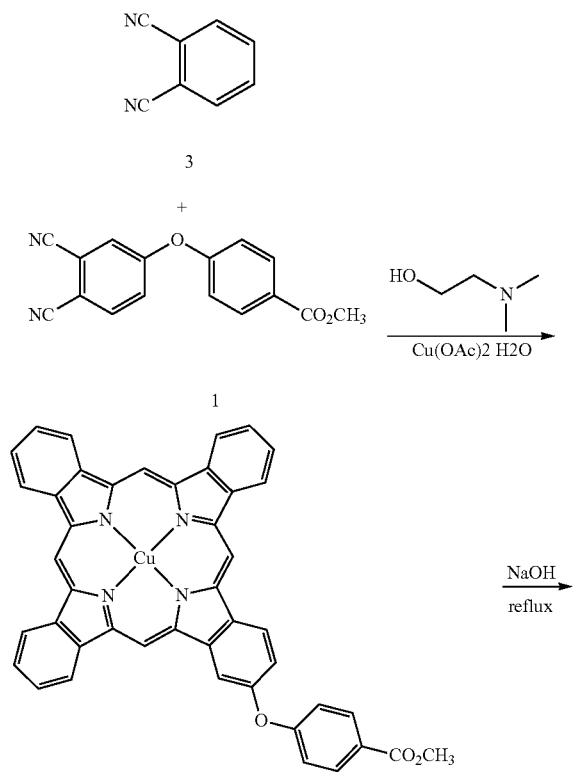

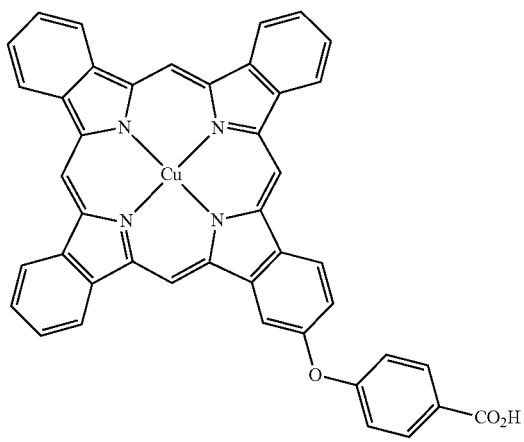

-continued

A modified copper phthalocyanine synergist comprising a single substituent prevents ordered packing and enables easy dispersion of the pigment in a phase change ink vehicle. A mixture comprising substituted and un-substituted phthalonitriles in a molar ratio of 1:3 can be employed to prepare a mono-substituted pigment. By the combinatorial nature of adding mixtures of substituted and unsubstituted phthalonitriles as starting materials, the resulting products contain multiple isomers. MALDI-TOF analysis of the synthesized synergist revealed a mixture of mono- and di-substituted phthalocyanines similar to that observed on the Solsperse® 5000 analysis.

Any suitable or desired dispersant can be selected for use with the novel synergist in phase change ink compositions herein. In embodiments, amphipathic dispersants comprising a polar head group comprising multiple amine groups and a long chain, non-polar tail can be selected. In certain embodiments, the novel synergist is employed with specific dispersants, in embodiments polyethyleneimine based dispersants, which have terminal or secondary amines that can combine with the free acid groups on the synergist. In certain embodiments, the dispersant can be a polyethyleneimine dispersant, PEI-1, as described in U.S. Pat. No. 7,973,186, which is hereby incorporated by reference herein in its entirety, and which, in embodiments, is of the formula

PEI-1

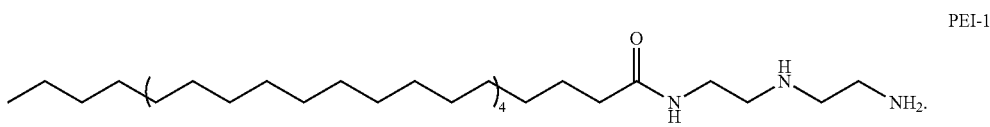

In certain embodiments, the dispersant can be an amine based dispersant.

In embodiments, the dispersant can be the dispersant commercially available from Lubrizol Corporation as Solsperse® 13240.

The present disclosure encompasses a phase change ink composition comprising a pigment; a carrier; a dispersant; and a copper phthalocyanine synergist having a carboxylic acid group thereon. The various components and processes described throughout the present disclosure can be selected for phase ink change ink composition embodiments comprising the novel synergist.

The present disclosure also encompasses a method for preparing a phase change ink composition comprising combining a pigment, a carrier; a dispersant; and a copper phthalocyanine synergist having a carboxylic acid group thereon, to produce a phase change ink composition.

The present disclosure also encompasses a method comprising incorporating into an ink jet printing apparatus a phase change ink composition comprising a pigment, a carrier; a dispersant; and a copper phthalocyanine synergist having a carboxylic acid group thereon; melting the ink composition; and causing droplets of the melted ink to be ejected in an imagewise pattern onto a substrate.

The present disclosure also encompasses an ink jet printer stick or pellet containing a phase change ink composition comprising a pigment, a carrier; a dispersant; and a copper phthalocyanine synergist having a carboxylic acid group thereon.

Colorant.

The phase change ink compositions can include any suitable pigment as colorant. If desired, a dye or other material can be added, in embodiments as taggants for security or other purposes. The phase change ink compositions can include a dye, and, if desired, any suitable or desired additional colorant selected from the group consisting of traditional dyes, pigments, and mixtures and combinations thereof; and optionally, an additional colorant that is a second, different modified naturally-derived colorant. If more than one colorant is included, the total amount of colorant present in the phase change ink composition can be any desired or effective amount to obtain the desired color or hue, in embodiments from about 0.1 to about 50 percent, or from about 0.1 percent to about 20 percent total colorant by weight based on the total weight of the phase change ink composition.

Any desired or effective colorant can be employed as the optional additional colorant in the inks, including dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon® Red 492 (BASF); Orasol® Red G (Pylam Products); Direct Brilliant Pink B (Oriental Giant Dyes); Direct Red 3BL (Classic Dyestuffs); Supranol® Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol® Brilliant Yellow 4GF (Clariant); Cibanone Yellow 2G (Classic Dyestuffs); Orasol® Black RLI (BASF); Orasol® Black CN (Pylam Products); Savinyl Black RLSN(Clariant); Pyrazol Black BG (Clariant); Morfast® Black 101 (Rohm & Haas); Diaazol Black RN (ICI); Thermoplast® Blue 670 (BASF); Orasol® Blue GN (Pylam Products); Savinyl Blue GLS (Clariant); Luxol Fast Blue MBSN (Pylam Products); Sevron Blue 5GMF (Classic Dyestuffs); Basacid® Blue 750 (BASF); Keyplast Blue (Keystone Aniline Corporation); Neozapon® Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen® Blue FF-4012 (BASF); Fastol® Black BR (C.I. Solvent Black 35) (Chemische Fabriek Triade BV); Morton Morplas Magenta 36 (C.I. Solvent Red 172); metal phthalocyanine colorants, such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are hereby incorporated by reference herein in their entireties, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint® Orange X-38, uncut Reactint® Blue X-17, Solvent Yellow 162, Acid Red 52, Solvent Blue 44, and uncut Reactint® Violet X-80.

Pigments are also suitable optional additional colorants for the phase change ink. Examples of suitable pigments include PALIOGEN® Violet 5100 (BASF); PALIOGEN® Violet 5890 (BASF); HELIOGEN® Green L8730 (BASF); LITHOL® Scarlet D3700 (BASF); SUNFAST® Blue 15:4 (Sun Chemical); Hostaperm® Blue B2G-D (Clariant); Hostaperm® Blue B4G (Clariant); SPECTRA® PAC C Blue 15:4 (Sun Chemical); Permanent Red P-F7RK; Hostaperm® Violet BL (Clariant); LITHOL® Scarlet 4440 (BASF); Bon Red C (Dominion Color Company); ORACET® Pink RF (BASF); PALIOGEN® Red 3871 K (BASF); SUNFAST® Blue 15:3 (Sun Chemical); PALIOGEN® Red 3340 (BASF); SUNFAST® Carbazole Violet 23 (Sun Chemical); LITHOL® Fast Scarlet L4300 (BASF); SUNBRITE® Yellow 17 (Sun Chemical); HELIOGEN® Blue L6900, L7020 (BASF); SUNBRITE® Yellow 74 (Sun Chemical); SPECTRA® PAC C Orange 16 (Sun Chemical); HELIOGEN® Blue K6902, K6910 (BASF); SUNFAST® Magenta 122 (Sun Chemical); HELIOGEN® Blue D6840, D7080 (BASF); Sudan Blue OS (BASF); NEOPEN® Blue FF4012 (BASF); PV Fast Blue B2GO1 (Clariant); IRGALITE® Blue GLO (BASF); PALIOGEN® Blue 6470 (BASF); Sudan Orange G (Aldrich); Sudan Orange 220 (BASF); PALIOGEN® Orange 3040 (BASF); PALIOGEN® Yellow 152, 1560 (BASF); LITHOL® Fast Yellow 0991K (BASF); PALIOTOL® Yellow 1840 (BASF); NOVOPERM® Yellow FGL (Clariant); Ink Jet Yellow 4G VP2532 (Clariant); Toner Yellow HG (Clariant); Lumogen® Yellow D0790 (BASF); Suco-Yellow L1250 (BASF); Suco-Yellow D1355 (BASF); Suco Fast Yellow D1355, D1351 (BASF); HOSTAPERM® Pink E 02 (Clariant); Hansa Brilliant Yellow 5GX03 (Clariant); Permanent Yellow GRL 02 (Clariant); Permanent Rubine L6B 05 (Clariant); FANAL® Pink D4830 (BASF); CINQUASIA® Magenta (DU PONT); PALIOGEN® Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are hereby totally incorporated by reference herein in their entireties.

Pigment.

In specific embodiments, the phase change ink compositions herein are pigmented phase change ink compositions. The phase change ink compositions herein can include one or more pigments as the colorant and in specific embodiments do not include any other non-pigment colorant. Alternately, the phase change ink compositions herein can include one or more pigments and an additional colorant selected from any suitable or desired colorant including dyes, pigments, mixtures thereof, and the like. In embodiments, the pigment is selected from the group consisting of metal phthalocyanine, metal-free phthalocyanine, and mixtures and combinations thereof. In embodiments, the pigment is selected from the group consisting wherein the pigment is selected from the group consisting of cyan, green, blue, black, carbon black, C.I. Pigment Blue 15:0, C.I. Pigment Blue 15:1, C.I. Pigment Blue 15:2, C.I. Pigment Blue 15:3, C.I. Pigment Blue 15:4, C.I. Pigment Blue 15:5, C.I. Pigment Blue 15:6, C.I. Pigment Green 7, C.I. Pigment Green 36, C.I. Pigment Black 7, copper phthalocyanine, and mixtures and combinations thereof. In certain embodiments, the phase change ink composition includes a pigment selected from the group consisting of cyan, green, blue, black, carbon black, Pigment Blue, copper phthalocyanine, and mixtures and combinations thereof. In a specific embodiment, the pigment is a cyan pigment.

Suitable pigments that can be used in embodiments herein include, for example, PALIOGEN® Violet 5100 (commercially available from BASF); PALIOGEN® Violet 5890 (commercially available from BASF); HELIOGEN® Green L8730 (commercially available from BASF); LITHOL® Scarlet D3700 (commercially available from BASF); SUN-FAST® Blue 15:4 (commercially available from Sun Chemical); HOSTAPERM® Blue B2G-D (commercially available from Clariant); HOSTAPERM® Blue B4G (commercially available from Clariant); Permanent Red P-F7RK; HOSTAPERM® Violet BL (commercially available from Clariant); LITHOL® Scarlet 4440 (commercially available from BASF); Bon Red® C (commercially available from Dominion Color Company); ORACET® Pink RF (commercially available from Ciba); PALIOGEN® Red 3871 K (commercially available from BASF); SUNFAST® Blue 15:3 (commercially available from Sun Chemical); PALIOGEN® Red 3340 (commercially available from BASF); SUNFAST® Carbazole Violet 23 (commercially available from Sun Chemical); LITHOL® Fast Scarlet L4300 (commercially available from BASF); SUNBRITE® Yellow 17 (commercially available from Sun Chemical); HELIOGEN® Blue L6900, L7020 (commercially available from BASF); SUNBRITE® Yellow 74 (commercially available from Sun Chemical); SPECTRA® PAC C Orange 16 (commercially available from Sun Chemical); HELIOGEN® Blue K6902, K6910 (commercially available from BASF); SUNFAST® Magenta 122 (commercially available from Sun Chemical); HELIOGEN® Blue D6840, D7080 (commercially available from BASF); Sudan Blue OS (commercially available from BASF); NEOPEN® Blue FF4012 (commercially available from BASF); PV Fast Blue B2GO1 (commercially available from Clariant); IRGALITE® Blue BCA (commercially available from Ciba); PALIOGEN® Blue 6470 (commercially available from BASF); Sudan Orange G (commercially available from Aldrich), Sudan Orange 220 (commercially available from BASF); PALIOGEN® Orange 3040 (BASF); PALIOGEN® Yellow 152, 1560 (commercially available from BASF); LITHOL® Fast Yellow 0991 K (commercially available from BASF); PALIOTOL® Yellow 1840 (commercially available from BASF); NOVOPERM® Yellow FGL (commercially available from Clariant); Ink Jet Yellow 4G VP2532 (commercially available from Clariant); Toner Yellow HG (commercially available from Clariant); Lumogen® Yellow D0790 (commercially available from BASF); Suco-Yellow L1250 (commercially available from BASF); Suco-Yellow D1355 (commercially available from BASF); Suco Fast Yellow D1 355, D1 351 (commercially available from BASF); HOSTAPERM® Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL® Pink D4830 (commercially available from BASF); CINQUASIA® Magenta (commercially available from DU PONT); PALIOGEN® Black L0084 (commercially available from BASF); Pigment Black K801 (commercially available from BASF); and carbon blacks such as REGAL® 330 (commercially available from Cabot), Nipex® 150 (commercially available from Degussa) Carbon Black 5250 and Carbon Black 5750 (commercially available from Columbia Chemical), and the like, as well as mixtures thereof.

The pigment can be provided in the phase change ink composition in any suitable or desired amount. In embodiments, the pigment can be present in an amount of from about 0.1 to about 20 percent, or from about 0.5 percent to about 5 percent, or about 0.75 to about 3 percent total pigment, based on the total weight of the phase change ink composition.

Carrier.

The phase change ink compositions herein can further include an ink vehicle or carrier. The phase change ink compositions can include any suitable ink vehicle such as paraffins, microcrystalline waxes, polyethylene waxes, ester waxes, amides, fatty acids and other waxes or waxy materials, fatty amide containing materials, sulfonamide materials, resinous materials made from different natural sources (tall oil rosins and rosin esters, for example), and many synthetic resins, oligomers, polymers, and copolymers such as further discussed below.

In embodiments, the phase change ink compositions herein include a polyalkylene wax. In specific embodiments, the wax is a polymethylene wax, a polyethylene wax, or a mixture of combination thereof.

In certain embodiments, the phase change ink compositions herein include a biodegradable wax. In embodiments, the biodegradable wax is a biodegradable polyethylene wax. For example, the wax can be a biodegradable polyethylene wax sold under the name Accumelt® 78, from IGI Waxes.

In embodiments, the phase change ink compositions herein further comprise a low melting wax. In embodiments, the low melting wax is a polyalkylene wax, a functional wax, or a combination thereof. The term "functional wax" is known to one of skill in the art and can mean herein any suitable functional wax, in embodiments, including, but not limited to, a wax with polar groups, for example, alcohols, amides, esters, urethanes, etc. As used herein, the term "low melting wax" includes any suitable low melting wax, including, in embodiments, a wax having a melting point of less than about 120° C.

Examples of suitable amides include, for example, diamides, triamides, tetra-amides, cyclic amides and the like. Suitable triamides include, for example, those disclosed in U.S. Pat. No. 6,860,930, the entire disclosure of which is incorporated herein by reference. Suitable other amides, such as fatty amides including monoamides, tetra-amides, and mixtures thereof, are disclosed in, for example, U.S. Pat. Nos. 4,889,560, 4,889,761, 5,194,638, 4,830,671, 6,174,937, 5,372,852, 5,597,856, and 6,174,937, and British Patent No. GB 2 238 792, the entire disclosures of each are incorporated herein by reference.

The wax can be present in the phase change ink composition in any suitable or desired amount. In embodiments, the wax is present in the phase change ink composition in an amount of from about 25 percent to about 65 percent by weight based on the total weight of the dye-based phase change ink composition. In embodiments, the wax is a low melting wax present in the phase change ink composition in an amount of from about 25% to less than about 65% by weight based on the total weight of the ink carrier.

Other suitable carrier materials that can be used in the phase change ink composition include isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780, 528, 5,782,966, 5,783,658, 5,827,918, 5,830,942, 5,919,839, 6,255,432, and 6,309,453, British Patents Nos. GB 2 294 939, GB 2 305 928, GB 2 305 670, and GB 2 290 793, and PCT Publications WO 94/14902, WO 97/12003, WO 97/13816, WO 96/14364, WO 97/33943, and WO 95/04760, the entire disclosures of each of which are incorporated herein by reference. In embodiments, the phase change ink composition can comprise a mixture of one or more amides and one or more isocyanate-derived materials.

Further examples of suitable ink vehicles include ethylene/propylene copolymers, such as those available from Baker Petrolite. Commercial examples of such copolymers include, for example, Petrolite CP-7 (Mn=650), Petrolite CP-11 (Mn=1,100, Petrolite CP-12 (Mn=1,200) and the like. The copolymers may have, for example, a melting point of from about 70° C. to about 150° C., such as from about 80° C. to about 130° C. or from about 90° C. to about 120° C. and a molecular weight range (Mn) of from about 500 to about 4,000.

Another type of ink vehicle may be n-paraffinic, branched paraffinic, and/or naphthenic hydrocarbons, typically with from about 5 to about 100, such as from about 20 to about 80 or from about 30 to about 60 carbon atoms, generally prepared by the refinement of naturally occurring hydrocarbons, such as BE SQUARE® 185 and BE SQUARE® 195, with molecular weights (Mn) of from about 100 to about 5,000, such as from about 250 to about 1,000 or from about 500 to about 800, for example such as available from Baker Petrolite.

Highly branched hydrocarbons, typically prepared by olefin polymerization, such as the VYBAR® materials available from Baker Petrolite, including VYBAR® 253 (Mn=520), VYBAR® 5013 (Mn=420), and the like, may also be used. In addition, the ink vehicle may be an ethoxylated alcohol, such as available from Baker Petrolite and of the general formula

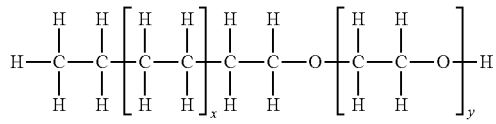

wherein x is an integer of from about 1 to about 50, such as from about 5 to about 40 or from about 11 to about 24 and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight (Mn) range of from about 100 to about 5,000, such as from about 500 to about 3,000 or from about 500 to about 2,500. Commercial examples include UNITHOX® 420 (Mn=560), UNITHOX® 450 (Mn=900), UNITHOX® 480 (Mn=2,250), UNITHOX® 520 (Mn=700), UNITHOX® 550 (Mn=1,100), UNITHOX® 720 (Mn=875), UNITHOX 750 (Mn=1,400), and the like.

As an additional example, the ink vehicle may be made of fatty amides, such as monoamides, tetra-amides, mixtures thereof, and the like, for example such as described in U.S. Pat. No. 6,858,070, which is hereby incorporated herein by reference. Suitable monoamides may have a melting point of at least about 50° C., for example from about 50° C. to about 150° C., although the melting point can be outside these ranges. Specific examples of suitable monoamides include, for example, primary monoamides and secondary monoamides. stearamide, such as KEMAMIDE® S available from Witco Chemical Company and CRODAMIDE® S available from Croda, behenamide/arachidamide, such as KEMAMIDE® B available from Witco and CRODAMIDE® BR available from Croda, oleamide, such as KEMAMIDE® U available from Witco and CRODAMIDE® OR available from Croda, technical grade oleamide, such as KEMAMIDE® O available from Witco, CRODAMIDE® O available from Croda, and UNISLIP® 1753 available from Uniqema, and erucamide such as KEMAMIDE® E available from Witco and CRODAMIDE® ER available from Croda, are some examples of suitable primary amides. Behenyl behenamide, such as KEMAMIDE® EX666 available from Witco, stearyl stearamide, such as KEMAMIDE® S-180 and KEMAMIDE® EX-672 available from Witco, stearyl erucamide, such as KEMAMIDE® E-180 available from Witco and CRODAMIDE® 212 available from Croda, erucyl erucamide, such as KEMAMIDE® E-221 available from Witco, oleyl palmitamide, such as KEMAMIDE® P-181 available from Witco and CRODAMIDE® 203 available from Croda, and erucyl stearamide, such as KEMAMIDE® S-221 available from Witco, are some examples of suitable secondary amides. Additional suitable amide materials include KEMAMIDE® W40 (N,N'-ethylenebisstearamide), KEMAMIDE® P181 (oleyl palmitamide), KEMAMIDE® W45 (N,N'-thylenebisstearamide), and KEMAMIDE® W20 (N,N'-ethylenebisoleamide).

In embodiments, the phase change ink composition includes (a) stearyl stearamide, (b) a dimer acid based tetra-amide that is the reaction product of dimer acid, ethylene diamine, and stearic acid, or (c) mixtures thereof. The phase change ink composition can include a mixture of one or more amides and one or more isocyanate-derived materials.

High molecular weight linear alcohols, such as those available from Baker Petrolite and of the general formula

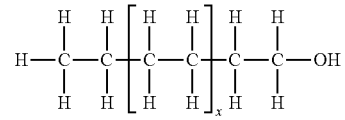

wherein x is an integer of from about 1 to about 50, such as from about 5 to about 35 or from about 11 to about 23, may also be used as the ink vehicle. These materials may have a melting point of from about 50° C. to about 150° C., such as from about 70° C. to about 120° C. or from about 75° C. to about 110° C., and a molecular weight (Mn) range of from about 100 to about 5,000, such as from about 200 to about 2,500 or from about 300 to about 1,500. Commercial examples include the UNILIN® materials such as UNILIN® 425 (Mn=460), UNILIN® 550 (Mn=550), UNILIN® 700 (Mn=700), and distilled alcohols, the viscosity of which at the jetting temperature in one embodiment can be from about 5 to about 50% higher than the non-distilled alcohol.

A still further example includes hydrocarbon-based waxes, such as the homopolymers of polyethylene available from Baker Petrolite and of the general formula

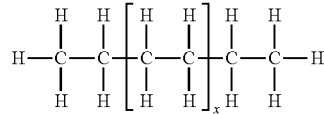

wherein x is an integer of from about 1 to about 200, such as from about 5 to about 150 or from about 12 to about 105.

These materials may have a melting point of from about 60° C. to about 150° C., such as from about 70° C. to about 140° C. or from about 80° C. to about 130° C. and a molecular weight (Mn) of from about 100 to about 5,000, such as from about 200 to about 4,000 or from about 400 to about 3,000. Example waxes include PW400 (Mn about 400), distilled PW400, in one embodiment having a viscosity of about 10% to about 100% higher than the viscosity of the undistilled POLYWAX® 400 at about 110° C., POLYWAX 500 (Mn about 500), distilled POLYWAX® 500, in one embodiment having a viscosity of about 10% to about 100% higher than the viscosity of the undistilled POLYWAX® 500 at about 110 C, POLYWAX 655 (Mn about 655), distilled POLYWAX® 655, in one embodiment having a viscosity of about 10% to about 50% lower than the viscosity of the undistilled POLYWAX® 655 at about 110° C., and in yet another embodiment having a viscosity of about 10% to about 50% higher than the viscosity of the undistilled POLYWAX® 655 at about 110° C. POLYWAX 850 (Mn about 850), POLYWAX 1000 (Mn about 1,000), and the like.

Another example includes modified maleic anhydride hydrocarbon adducts of polyolefins prepared by graft copolymerization, such as those available from Baker Petrolite and of the general formulas

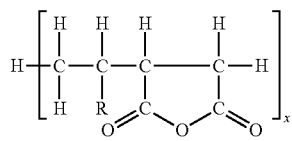

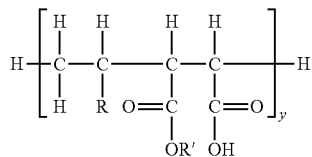

wherein R is an alkyl group with from about 1 to about 50, such as from about 5 to about 35 or from about 6 to about 28 carbon atoms, R' is an ethyl group, a propyl group, an isopropyl group, a butyl group, an isobutyl group, or an alkyl group with from about 5 to about 500, such as from about 10 to about 300 or from about 20 to about 200 carbon atoms, x is an integer of from about 9 to about 13, and y is an integer of from about 1 to about 50, such as from about 5 to about 25 or from about 9 to about 13, and having melting points of from about 50° C. to about 150° C., such as from about 60° C. to about 120° C. or from about 70° C. to about 100° C.; and those available from Baker Petrolite and of the general formula

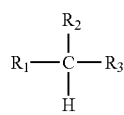

wherein $R_1$ and $R_3$ are hydrocarbon groups and $R_2$ is either of one of the general formulas

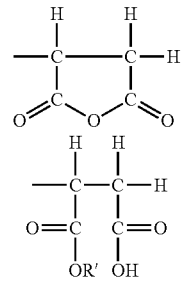

or a mixture thereof, wherein R' is an isopropyl group, which materials may have melting points of from about 70° C. to about 150° C., such as from about 80° C. to about 130° C. or from about 90° C. to about 125° C., with examples of modified maleic anhydride copolymers including CERAMER® 67 (Mn=655, Mw/Mn=1.1), CERAMER® 1608 (Mn=700, Mw/Mn=1.7), and the like.

Additional examples of suitable ink vehicles for the phase change inks include rosin esters; polyamides; dimer acid amides; fatty acid amides, including ARAMID® C; epoxy resins, such as EPOTUF® 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX® MH and KETJENFLEX® MS80; benzoate esters, such as BENZOFLEX® 5552, available from Velsicol Chemical Company; phthalate plasticizers; citrate plasticizers; maleate plasticizers; sulfones, such as diphenyl sulfone, n-decyl sulfone, n-arnyl sulfone, chlorophenyl methyl sulfone; polyvinyl pyrrolidinone copolymers; polyvinyl pyrrolidone/polyvinyl acetate copolymers; novolac resins, such as DUREZ® 12 686, available from Occidental Chemical Company; and natural product waxes, such as beeswax, monton wax, candelilla wax, OILS ONITE® (American Gilsonite Company), and the like; mixtures of linear primary alcohols with linear long chain amides or fatty acid amides, such as those with from about 6 to about 24 carbon atoms, including PARICIN® 9 (propylene glycol monohydroxystearate), PARICIN® 13 (glycerol monohydroxystearate), PARICIN® 15 (ethylene glycol monohydroxystearate), PARICIN® 220 (N(2-hydroxyethyl)-12-hydroxystearamide), PARICIN® 285 (N,N'-ethylene-bis-12-hydroxystearamide), FLEXRICIN® 185 (N,N'-ethylene-bis-ricinoleamide), and the like. Further, linear long chain sulfones with from about 4 to about 16 carbon atoms, such as n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, and the like, are suitable ink vehicle materials.

In addition, the ink vehicles described in U.S. Pat. No. 6,906,118, which is incorporated herein by reference in its entirety, may also be used. The ink vehicle may contain a branched triamide such as those described in U.S. Pat. No. 6,860,930, the disclosure of which is also incorporated by reference herein,

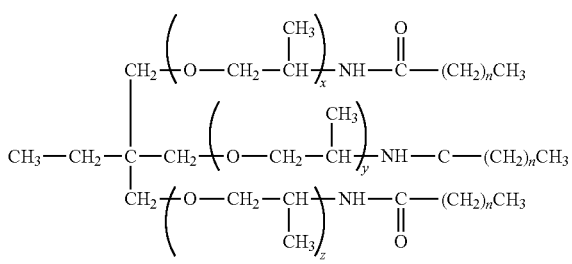

wherein n has an average value of from about 34 equal to or less than 40, where x, y and z can each be zero or an integer, and wherein the sum of x, y, and z is from about 5 and equal to or less than 6.

A rosin ester resin, mixtures thereof, or the like can also be included in the dye-based phase change ink composition. The rosin ester resin is present in any desired or effective amount, in embodiments from 0.5% to about 20% by weight of the total ink composition. Examples of suitable rosin ester resins include PINECRYSTAL® KE-100 (commercially available from Arakawa), and the like.

The phase change ink composition can include ink carrier comprising wax and other optional carrier components in any desired or effective amount, in one embodiment in an amount of at least about 50% to about 99 by total weight of the phase change ink composition, although the amount can be outside of this range. In certain embodiments, the ink carrier can be present in an amount of from about 25% to about 65% by total weight of the phase change ink composition.

Dispersant.

The phase change ink compositions herein can contain a dispersant. Any suitable or desired dispersant can be employed. In embodiments, the dispersant can be a dispersant described in U.S. Pat. No. 7,973,186 of Adela Goredema, et al., which is hereby incorporated by reference herein in its entirety. In specific embodiments, the dispersant is a compound of the formula

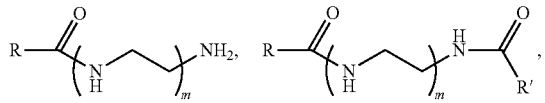

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

The dispersant can optionally be a polymeric dispersant such as those sold under the name Solsperse®, in embodiments, Solsperse® 1700, Solsperse® 13240, available from The Lubrizol Corporation.

The dispersant can be provided in the phase change ink composition in any suitable or desired amount. In embodiments, the dispersant can be present in an amount of from about 1 to about 500 percent, or from about 10 to about 300 percent, or from about 30 to about 200 percent total dispersant, based on the total weight of the pigment in the phase change ink composition.

Plasticizer.

Optionally, a plasticizer, which can be either a solid or liquid plasticizer, such as benzyl phthalates, triaryl phosphate esters, pentaerythritol tetrabenzoate, dialkyl adipate, dialkyl phthalates, dialkyl sebacate, alkyl benzyl phthalates, ethylene glycol monostearate, glycerol monostearate, propylene glycol monostearate, dicyclohexyl phthalate, diphenyl isophthalate, triphenyl phosphate, dimethyl isophthalate, and mixtures thereof, or the like can also be included in the ink carrier. The plasticizer is present in the ink carrier in any desired or effective amount, such as from about 0.05% by weight of the ink carrier. Examples of suitable plasticizers include SANTICIZER® 278, SANTICIZER® 154, SANTICIZER® 160, SANTICIZER® 261 (commercially available from Monsanto), and the like or mixtures thereof.

Antioxidant.

The inks of the present disclosure can also optionally contain an antioxidant. The optional antioxidants of the ink compositions protect the inks from oxidation during the printing process and also protect the ink components from oxidation during the heating portion of the ink preparation process. Specific examples of suitable antioxidants include NAUGUARD® 524, NAUGUARD® 76, and NAUGUARD® 512, commercially available from Chemtura Corporation, Philadelphia, Pa., IRGANOX® 1010, commercially available from BASF, and the like. When present, the optional antioxidant is present in the ink in any desired or effective amount, such as from about 0.01 percent to about 20 percent by weight of the ink.

A hindered amine antioxidant can optionally be present in the ink in any desired or effective amount, such as from about 0.001 percent to about 0.50 percent by weight of the total ink composition.

Examples of suitable hindered amine antioxidants include those of general formula

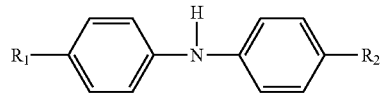

wherein $R_1$ and $R_2$ each, independently of the other, can be a hydrogen atom or an alkyl group, including linear, branched, saturated, unsaturated, cyclic, substituted, and unsubstituted alkyl groups, and wherein hetero atoms, such as oxygen, nitrogen, sulfur, silicon, phosphorus, boron, either may or may not be present in the alkyl group, in one embodiment with at least 1 carbon atom, if substituted, substitutions can be alkyl or phenyl.

Specific examples of suitable hindered amine antioxidants include the following antioxidants commercially available from Crompton; NAUGUARD® 445 where $R_1=R_2=C(CH_3)_2$ Ph, NAUGUARD® 635 where $R_1=R_2=-CH(CH_3)$ Ph, NAUGUARD® PS-30 where $R_1=C_4$ or $C_8$, $R_2=C_4$ or $C_8$ and the like.

A hindered phenol antioxidant can also be provided. In one embodiment the hindered phenol is present in a relatively high concentration. A high concentration of hindered phenol antioxidant maximizes long term thermal stability by delaying the onset of the oxidation itself. The hindered phenol antioxidant is present in the ink in any desired or effective amount, in embodiments from about 0.01% to about 4.0% by weight of the total ink composition. Specific examples of suitable hindered phenol antioxidants include ETHANOX® 330, ETHANOX® 310, ETHANOX® 314, ETHANOX® 376 (commercially available from Albemarle) and the like. Also commercially available from Ciba Specialty Chemicals are IRGANOX® 1010, IRGANOX® 1035, IRGA- NOX® 1076, IRGANOX® 1330 and the like. Mixtures of two or more of these hindered phenol antioxidants can also be employed.

Viscosity Modifier.

The inks of the present disclosure can also optionally contain a viscosity modifier. Examples of suitable viscosity modifiers include aliphatic ketones, such as stearone, and the like, polymers such as polystyrene, polymethylmethacrylate, thickening agents, such as those available from BYK Chemie, and others. When present, the optional viscosity modifier is present in the ink in any desired or effective amount, such as from about 0.1 to about 60 percent by weight of the ink.

Additional Optional Additives.

Other optional additives can be included in the inks of the present disclosure including clarifiers, tackifiers, such as FORAL® 85, a glycerol ester of hydrogenated abietic (rosin) acid (commercially available from Eastman), FORAL® 105, a pentaerythritol ester of hydroabietic (rosin) acid (commercially available from Eastman), CELLOLYN® 21, a hydroabietic (rosin) alcohol ester of phthalic acid (commercially available from Eastman), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Cray Valley), and the like; adhesives, such as VERSAMID® 757, 759, or 744 (commercially available from Cognix), plasticizers, such as UNIPLEX® 250 (commercially available from Uniplex), the phthalate ester plasticizers commercially available from Ferro under the trade name SANTICIZER®, such as dioctyl phthalate, diundecyl phthalate, alkylbenzyl phthalate (SANTICIZER® 278), triphenyl phosphate (commercially available from Ferro), KP-140®, a tributoxyethyl phosphate (commercially available from Chemtura Corporation), MORFLEX® 150, a dicyclohexyl phthalate (commercially available from Vertellus Specialties Inc.), trioctyl trimellitate (commercially available from Eastman Kodak Co.), and the like. Such additives can be included in conventional amounts for their usual purposes. The optional additives may be present in any suitable or desired amount, such as from about 0.1 to about 50 percent by weight of the ink.

In one specific embodiment, the ink carrier has a melting point of less than about 110° C., and in another embodiment of less than about 100° C., although the melting point of the ink carrier can be outside of these ranges. The phase change ink compositions disclosed herein in one embodiment have melting points in one embodiment equal to or less than about 130° C., in another embodiment equal to or less than about 120° C., in a further embodiment equal to or less than about 110° C., and in still another embodiment equal to or less than about 100° C., although the melting point can be outside of these ranges.

The phase change ink compositions prepared by the process disclosed herein generally have melt viscosities, at the jetting temperature which can be equal to or less than about 145° C., in one embodiment equal to or less than about 130° C., and in another embodiment equal to or less than about 120° C., in a further embodiment equal to or less than about 110° C., and in yet another embodiment equal to or less than about 80° C., although the jetting temperature can be outside of these ranges, which are in one embodiment equal to or less than about 30 centipoise (cps), in another embodiment equal to or less than about 25 cps, and in yet a further embodiment equal to or less than about 20 cps, and in another embodiment no less than about 2 cps, in a further embodiment no less than about 3 cps, and in yet a further embodiment no less than about 4 cps, although the melt viscosity can be outside of these ranges.

In certain embodiments, the phase change ink composition herein has a jetting temperature of from about 100° C. to about 130° C.

In embodiments, the phase change ink composition herein has a viscosity of about 9 to about 12 centipoise at 110° C. In certain embodiments, the phase change ink composition herein has a viscosity of about 10 centipoise at 110° C.

The phase ink compositions of the present disclosure can be prepared by any desired or suitable method. In embodiments, a method for preparing a phase change ink composition herein comprises combining a pigment; a carrier; a dispersant; and a copper phthalocyanine synergist having a carboxylic acid group thereon, to produce a phase change ink composition.

For example, the ink ingredients can be mixed together, followed by heating, to a temperature of at least about 100° C. to no more than about 140° C., although the temperature can be outside of this range, and stirring until a homogeneous ink composition is obtained, followed by cooling the ink to ambient temperature (typically from about 20 to about 25° C.). The inks of the present disclosure are solid at ambient temperature. In a specific embodiment, during the formation process, the inks in their molten state are poured into molds and then allowed to cool and solidify to form ink sticks.

In embodiments, an ink jet printer stick or pellet herein contains a phase change ink composition comprising a pigment; a carrier; a dispersant; and a copper phthalocyanine synergist having a carboxylic acid group thereon.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

In embodiments, a method herein comprises incorporating into an ink jet printing apparatus a phase change ink composition comprising a pigment; a carrier; a dispersant; and a copper phthalocyanine synergist having a carboxylic acid group thereon; melting the ink composition; and causing droplets of the melted ink to be ejected in an imagewise pattern onto a substrate. In certain embodiments, the pigment is a cyan pigment; the carrier is a polyethylene wax; the dispersant is a compound of the formula

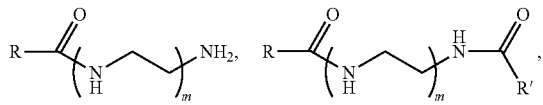

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

Any suitable substrate or recording sheet can be employed, including plain papers such as XEROX® 4024 papers, XEROX® Image Series papers, Courtland® 4024 DP® paper, ruled notebook paper, bond paper, silica coated papers such as Sharp Company silica coated paper, JuJo® paper, Hammermill® Laserprint Paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Formulations.

Ink concentrates were prepared using a Union Process Model 01 attritor, charged with 1,800 grams of ⅛" Grade 440C stainless steel media. Components of the concentrate vehicle were melted and stirred in a beaker until homogeneous, and then charged into the attritor. While stiffing at 100 revolutions per minute (rpm), the synergist powder was added over the course of about 2 to 3 minutes, followed by the pigment Hostaperm® Blue B4G, available from Clariant Corporation, which was added over the course of 5 minutes. The mixture was stirred at 100 rpm for 30 minutes to allow for sufficient wetting of the dry powders, and then the milling speed increased to 300 rpm for a period of about 72 hours. The resulting ink concentrate was then separated from the dispersion media by filtration.

Inks were prepared by adding a homogeneous molten diluent mixture to the aforementioned molten ink concentrate, which was stirred at 350 rpm using a magnetic stir bar. In each case below, the diluent mixture was comprised of S180® (stearyl stearamide, available from Crompton Corporation, 24.06 grams), KE100® (resin available from Arakawa Chemical Industries, 31.3 grams), Resin 6 (a triamide resin prepared as described in Example II of U.S. Pat. No. 6,860,930, which is hereby incorporated by reference herein in its entirety, 31.3 grams), Resin 12 (a plasticizer that is a urethane resin that is the adduct of three equivalents of stearyl isocyanate and a glycerol-based alcohol (prepared as described in Example IV of U.S. Pat. No. 6,309,453, which is hereby incorporated by reference herein in its entirety, 5.88 grams, Naugard® 445 (an aromatic amine antioxidant available from Crompton Corporation; 0.78 grams), and a polyethylene wax having an average peak molecular weight of from about 350 to about 730 grams per mole, a polydispersity of from about 1.03 to about 3.0, and an asymmetrical molecular weight distribution skewed toward the high molecular weight end, obtained from Baker Petrolite and modified as described in U.S. Pat. No. 7,407,539, which is hereby incorporated by reference herein in its entirety, 126.7 grams).

Example 1

An ink concentrate vehicle comprised of S180® (stearyl stearamide, available from Crompton Corporation, 104.2 grams), and Solsperse® 13240 (a polyethyleneimine dispersant available from Lubrizol Corporation, 28.8 grams), to which was added the modified carboxylated copper phthalocyanine synergist of the present disclosure of the formula

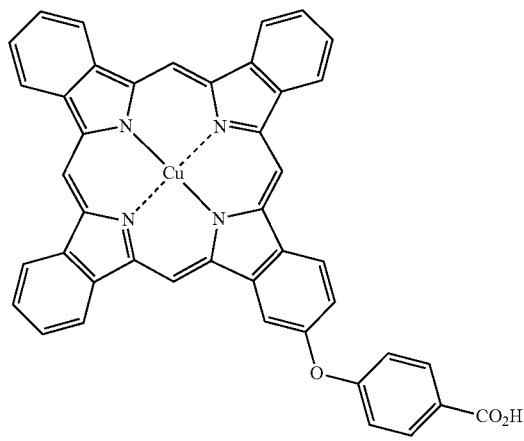

(3.0 grams), and the pigment Hostaperm® Blue B4G (available from Clariant Corporation, 24.0 grams).

To the stirred ink concentrate (30.0 grams) was slowly added a homogeneous molten mixture of the diluent (220.0 grams) described above. The resulting ink was stirred using a magnetic stir bar for a period of 1 hour at a temperature of 120° C.

Comparative Example 2

An ink concentrate vehicle comprised of S180® (stearyl stearamide, stearyl stearamide, available from Crompton Corporation, 104.2 grams), and PEI-1 (a polyethyleneimine dispersant as prepared in Example 1 of U.S. Pat. No. 7,973,186, which is hereby incorporated by reference herein in its entirety, 28.8 grams), to which was added the modified carboxylated copper phthalocyanine synergist of the present disclosure of the formula

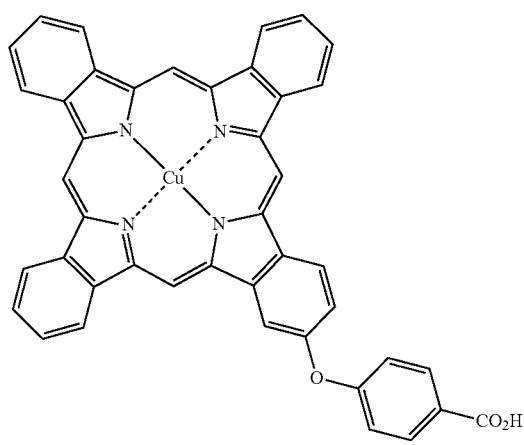

(3.0 grams), and the pigment Hostaperm® Blue B4G (available from Clariant Corporation, 24.0 grams).

To the stirred ink concentrate (30.0 grams) was slowly added a homogeneous molten mixture of the diluent (220.0 grams) described above. The resulting ink was stirred using a magnetic stir bar for a period of 1 hour at a temperature of 120° C.

Comparative Example 3

An ink concentrate vehicle comprised of S180® (stearyl stearamide, available from Crompton Corporation, 104.2 grams), and Solsperse® 13240 (a polyethyleneimine dispersant available from Lubrizol Corporation, 28.8 grams), to which was added the synergist Solsperse® 5000 (a derivatized sulfonated copper phthalocyanine, available from Lubrizol Corporation, 3.0 grams), and the pigment Hostaperm® Blue B4G (available from Clariant Corporation, 24.0 grams).

To the stirred ink concentrate (30.0 grams) was slowly added a homogeneous molten mixture of the diluent (220.0 grams) described above. The resulting ink was stirred using a magnetic stir bar for a period of 1 hour at a temperature of 120° C.

Comparative Example 4

The ink concentrate vehicle was comprised of S180® (stearyl stearamide, 104.2 grams), and PEI-1 (a polyethyleneimine dispersant as prepared in Example 1 of U.S. Pat. No. 7,973,186, which is hereby incorporated by reference herein in its entirety, 28.8 grams), to which was added the synergist Solsperse® 5000, (3.0 grams), and the pigment Hostaperm® Blue B4G, available from Clariant Corporation. (24.0 grams).

To the stirred ink concentrate (30.0 grams) was slowly added a homogeneous molten mixture of the diluent (220.0 grams) described above. The resulting ink was stirred using a magnetic stir bar for a period of 1 hour at a temperature of 120° C.

Particle Size.

The pigmented solid inks herein possess a suitable particle size and particle size stability at elevated temperatures. Dynamic light scattering is a commonly used metric for determining particle size. Measurement of the particle size of the molten ink immediately after filtration, and then again after a period of days gives a good indication of the stability of the ink. High energy ink processing can result in size reduction of the pigment particles to less than about 150 nanometers, or less than about 120 nanometers. Unstable systems will re-agglomerate, resulting in significant increases in particle size upon aging. This can eventually lead to particle sedimentation, which is detrimental to print quality and can damage the print head performance.

Particle size was measured for neat inks using a Malvern Zeta Sizer® HT at 100° C. Measurements were made on the day of preparation and then again on subsequent days. The ink was stored undisturbed in an oven at 120° C. between measurements. Following is a comparison of particle size stability of Example 1, an ink in accordance with an embodiment of the present disclosure having a Sunflo® SFD-B124/PEI-1 dispersant system, Comparative Ink Example 2 made with a Solsperse® 5000/PEI-1 dispersant system, Comparative Ink Example 3 made with a Solsperse® 5000/Solsperse® 13240 dispersant system, and Comparative Ink Example 4, made with a Sunflo® SFD-B124/Solsperse® 13240 dispersant system. The ink in Example 1 enjoys stable particle size over a period of 20 days, while the other three inks show significant signs of particle growth. The ink in Comparative Ink Example 4 displayed visual settling after standing undisturbed at 120° C. for two days, thus no further particle size measurements were made.

TABLE 1

Example 1 - Particle Size Stability

| Days Aged at 120° C. | Particle Size (Nanometers) | | | | |
|---|---|---|---|---|---|
| | Z Average Particle Size | D(50) | D(95) | PdI | Mean Count Rate (kcps) |
| 0 | 138.4 | 163.3 | 343.3 | 0.23 | 79.2 |
| 1 | 133.2 | 154.0 | 336.3 | 0.21 | 401.8 |
| 20 | 131.5 | 151.3 | 334.0 | 0.22 | 453.5 |

TABLE 2

Comparative Example 2 - Particle Size Stability

| Days Aged at 120° C. | Particle Size (Nanometers) | | | |
|---|---|---|---|---|
| | Z Average Particle Size | D(50) | D(95) | PdI |
| 0 | 168.0 | 177.8 | 522.3 | 0.24 |
| 1 | 225.6 | 260.0 | 2054.5 | 0.33 |

TABLE 3

Comparative Example 3 - Particle Size Stability

| Days Aged at 120° C. | Particle Size (Nanometers) | | | |
|---|---|---|---|---|
| | Z Average Particle Size | D(50) | D(95) | PdI |
| 0 | 144.1 | 157 | 400 | 0.24 |
| 2 | 147.2 | 169 | 345 | 0.20 |
| 8 | 171.9 | 190 | 440 | 0.22 |

TABLE 4

Comparative Example 4 - Particle Size Stability

| Days Aged at 120° C. | Particle Size (Nanometers) | | | |
|---|---|---|---|---|
| | Z Average Particle Size | D(50) | D(95) | PdI |
| 0 | 203.0 | 216.2 | 1861.0 | 0.46 |
| 1 | 182.3 | 204.5 | 422.3 | 0.36 |
| 5 | 207.9 | 230.7 | 609.3 | 0.44 |
| 7 | 207.3 | 241.2 | 571.7 | 0.40 |

In embodiments, a phase change ink containing a novel synergist is provided for particular use with phase changes inks. The novel synergist enables preparation of pigmented phase change inks having improved stability over previous pigmented phase change inks. The novel synergist provided herein is a derivative of copper phthalocyanine having a carboxylic acid moiety which enables covalent bonding between the carboxylic acid on the synergist and the free amine groups on the dispersant rather than relying on the ionic bonding as in previous dispersant-synergist systems. In certain embodiments, a phase change ink composition is provided having a novel synergist for cyan pigmented phase change ink dispersions.

It will be appreciated that various of the above-disclosed embodiments and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A copper phthalocyanine synergist having a carboxylic acid group thereon of the formula:

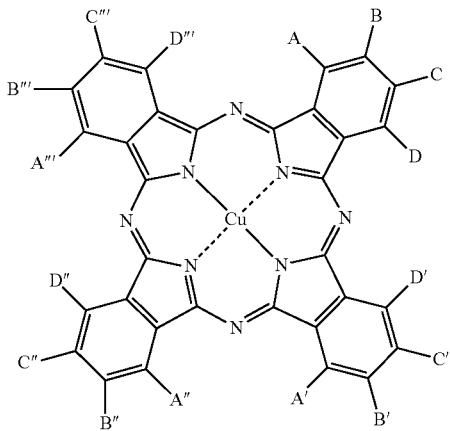

wherein each of A, B, C, and D, A', B', C', and D', A", B", C", and D", A''', B''', C''', and D''' are optionally present, provided that at least one of A, B, C, D, A', B', C', D', A", B", C", D", A''', B''', C''', and D''' is —COOH or R—COOH, and wherein each of A, B, C, and D, A', B', C', and D', A", B", C", and D", A''', B''', C''', and D''' are independently selected from the group consisting of hydrogen, —COOH and R—COOH wherein R is (i) an alkyl group, which can be linear or branched, saturated or unsaturated, cyclic or acyclic, substituted or unsubstituted alkyl, and wherein hetero atoms may optionally be present in the alky group, (ii) an aryl group, which can be substituted or unsubstituted aryl, and wherein hetero atoms may optionally be present in the aryl group, (iii) an arylalkyl group, which can be substituted or unsubstituted arylalkyl, wherein the alkyl portion of the arylalkyl can be linear or branched, saturated or unsaturated, cyclic or acyclic, and substituted or unsubstituted, and wherein hetero atoms may optionally be present in either the aryl portion or the alkyl portion of the arylalkyl, (iv) an alkylaryl group, which can be substituted or unsubstituted alkylaryl, wherein the alkyl portion of the alkylaryl can be linear or branched, saturated or unsaturated, cyclic or acyclic, and substituted or unsubstituted, and wherein hetero atoms may optionally be present in either the alkyl portion or the aryl portion of the alkylaryl group.

2. The copper phthalocyanine synergist of claim 1, having the formula

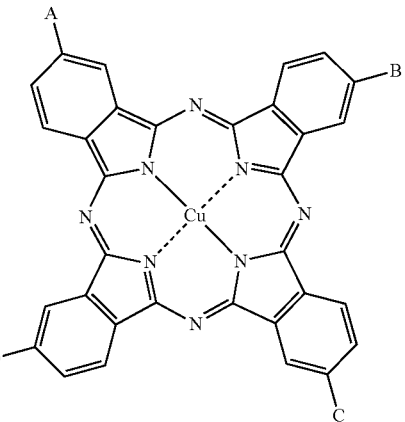

wherein A, B, C, and D are optionally present, provided that at least one of A, B, C, and D are present, and wherein each of A, B, C, and D are independently selected from the group consisting of —COOH and R—COOH wherein R is (i) an alkyl group, which can be linear or branched, saturated or unsaturated, cyclic or acyclic, substituted or unsubstituted alkyl, and wherein hetero atoms may optionally be present in the alky group, (ii) an aryl group, which can be substituted or unsubstituted aryl, and wherein hetero atoms may optionally be present in the aryl group, (iii) an arylalkyl group, which can be substituted or unsubstituted arylalkyl, wherein the alkyl portion of the arylalkyl can be linear or branched, saturated or unsaturated, cyclic or acyclic, and substituted or unsubstituted, and wherein hetero atoms may optionally be present in either the aryl portion or the alkyl portion of the arylalkyl, (iv) an alkylaryl group, which can be substituted or unsubstituted alkylaryl, wherein the alkyl portion of the alkylaryl can be linear or branched, saturated or unsaturated, cyclic or acyclic, and substituted or unsubstituted, and wherein hetero atoms may optionally be present in either the alkyl portion or the aryl portion of the alkylaryl group.

3. The copper phthalocyanine synergist of claim 1, having the formula

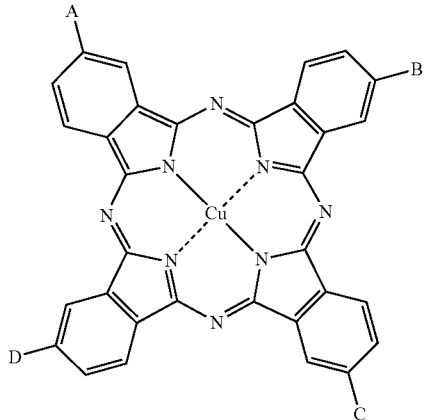

wherein A, B, C, and D are optionally present, provided that at least one of A, B, C, and D are present, and wherein A, B, C, and D are of the formula

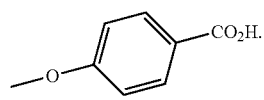

4. The copper phthalocyanine synergist of claim 1, having the formula
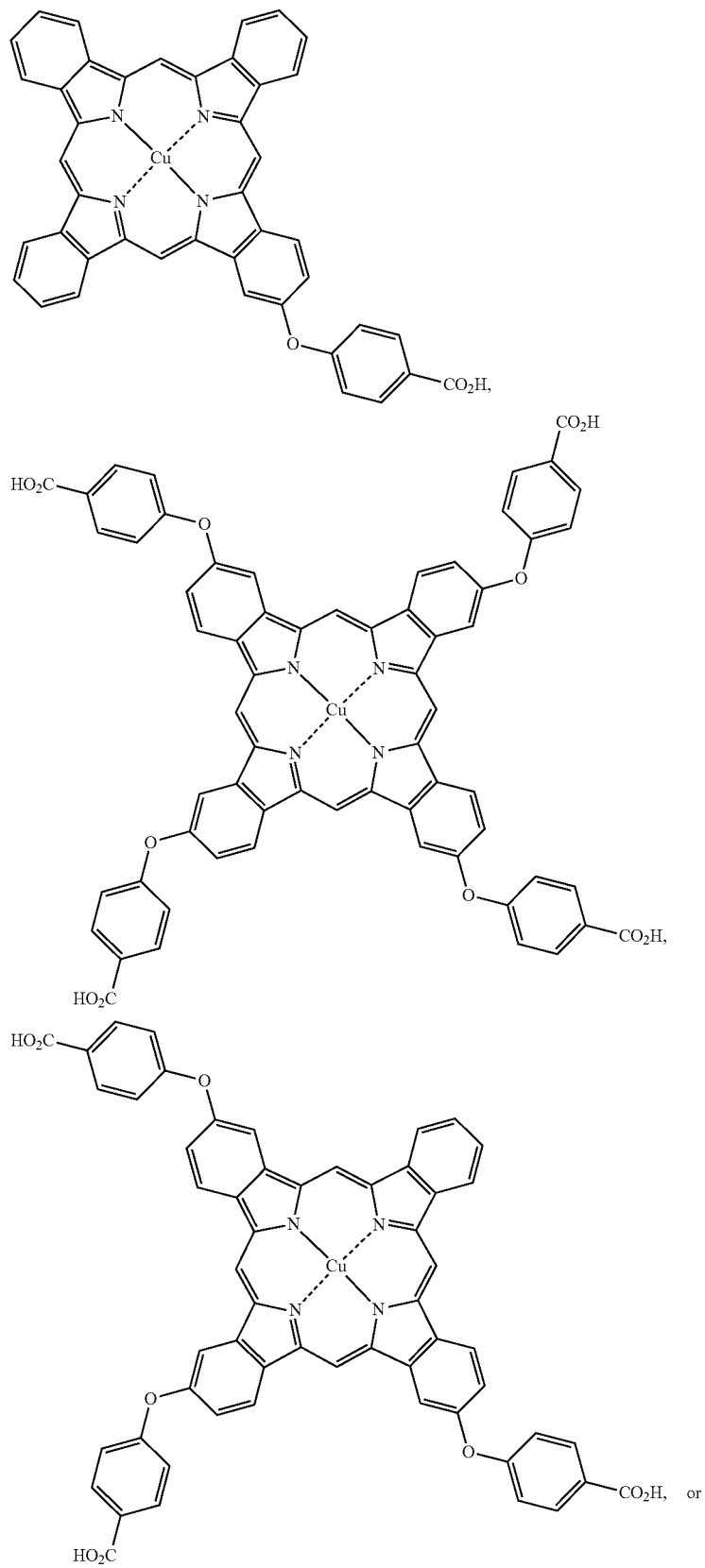

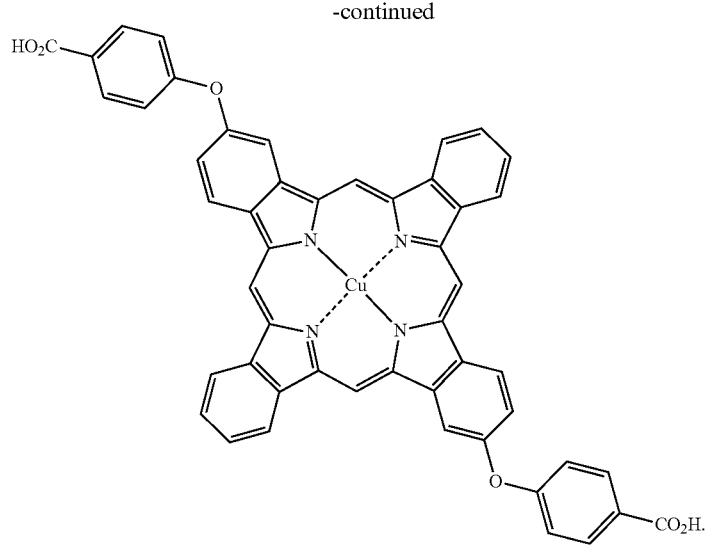

5. The copper phthalocyanine synergist of claim 1, having the formula

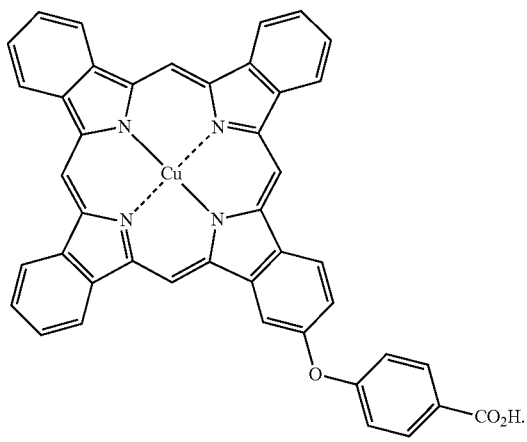

6. A phase change ink composition comprising:
a pigment;
a carrier;
a dispersant; and
a copper phthalocyanine synergist having a carboxylic acid group thereon of the formula:

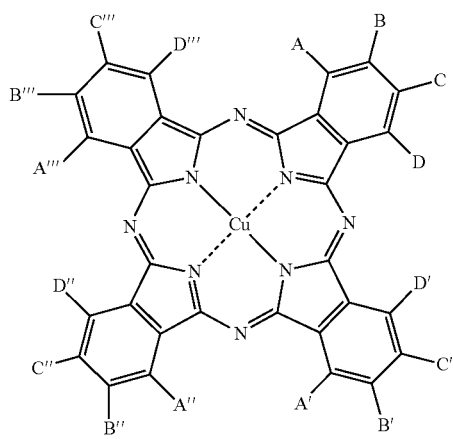

wherein each of A, B, C, and D, A', B', C', and D', A", B", C", and D", A'", B'", C'", and D'" are optionally present, provided that at least one of A, B, C, D, A', B', C', D', A", B", C", D", A'", B'", C'", and D'" is —COOH or R—COOH, and wherein each of A, B, C, and D, A', B', C', and D', A", B", C", and D", A'", B'", C'", and D'" are independently selected from the group consisting of hydrogen, —COOH and R—COOH wherein R is (i) an alkyl group, which can be linear or branched, saturated or unsaturated, cyclic or acyclic, substituted or unsubstituted alkyl, and wherein hetero atoms may optionally be present in the alky group, (ii) an aryl group, which can be substituted or unsubstituted aryl, and wherein hetero atoms may optionally be present in the aryl group, (iii) an arylalkyl group, which can be substituted or unsubstituted arylalkyl, wherein the alkyl portion of the arylalkyl can be linear or branched, saturated or unsaturated, cyclic or acyclic, and substituted or unsubstituted, and wherein hetero atoms may optionally be present in either the aryl portion or the alkyl portion of the arylalkyl, (iv) an alkylaryl group, which can be substituted or unsubstituted alkylaryl, wherein the alkyl portion of the alkylaryl can be linear or branched, saturated or unsaturated, cyclic or acyclic, and substituted or unsubstituted, and wherein hetero atoms may optionally be present in either the alkyl portion or the aryl portion of the alkylaryl group.

7. The phase change ink composition of claim 6, wherein the copper phthalocyanine synergist is of the formula

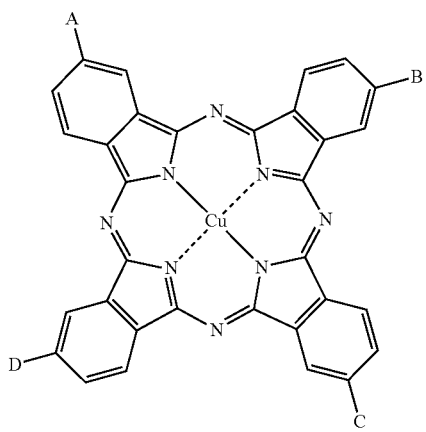

wherein A, B, C, and D are optionally present, provided that at least one of A, B, C, and D are present, and wherein each of A, B, C, and D are independently selected from the group consisting of —COOH and R—COOH wherein R is (i) an alkyl group, which can be linear or branched, saturated or unsaturated, cyclic or acyclic, substituted or unsubstituted alkyl, and wherein hetero atoms may optionally be present in the alky group, (ii) an aryl group, which can be substituted or unsubstituted aryl, and wherein hetero atoms may optionally be present in the aryl group, (iii) an arylalkyl group, which can be substituted or unsubstituted arylalkyl, wherein the alkyl portion of the arylalkyl can be linear or branched, saturated or unsaturated, cyclic or acyclic, and substituted or unsubstituted, and wherein hetero atoms may optionally be present in either the aryl portion or the alkyl portion of the arylalkyl, (iv) an alkylaryl group, which can be substituted or unsubstituted alkylaryl, wherein the alkyl portion of the alkylaryl can be linear or branched, saturated or unsaturated, cyclic or acyclic, and substituted or unsubstituted, and wherein hetero atoms may optionally be present in either the alkyl portion or the aryl portion of the alkylaryl group.

8. The phase change ink composition of claim 6, wherein the copper phthalocyanine synergist is of the formula

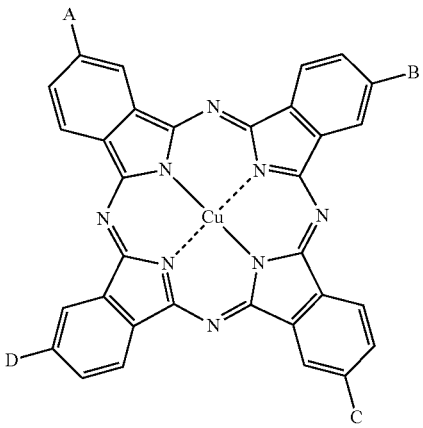

wherein A, B, C, and D are optionally present, provided that at least one of A, B, C, and D are present, and wherein A, B, C, and D are of the formula

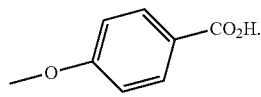

9. The phase change ink composition of claim 6, wherein the copper phthalocyanine synergist is of the formula

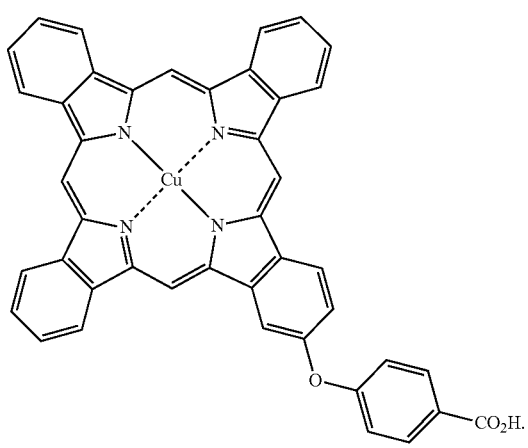

10. The phase change ink composition of claim 6, wherein the pigment is selected from the group consisting wherein the pigment is selected from the group consisting of cyan, green, blue, black, carbon black, C.I. Pigment Blue 15:0, C.I. Pigment Blue 15:1, C.I. Pigment Blue 15:2, C.I. Pigment Blue 15:3, C.I. Pigment Blue 15:4, C.I. Pigment Blue 15:5, C.I. Pigment Blue 15:6, C.I. Pigment Green 7, C.I. Pigment Green 36, C.I. Pigment Black 7, copper phthalocyanine, and mixtures and combinations thereof.

11. The phase change ink composition of claim 6, wherein the pigment is a cyan pigment.

12. The phase change ink composition of claim 6, wherein the dispersant a compound of the formula

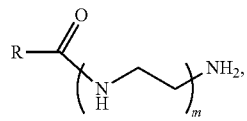

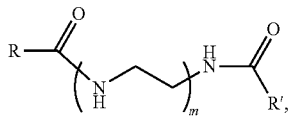

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

13. A method comprising:
    incorporating into an ink jet printing apparatus a phase change ink composition comprising a pigment, a carrier; a dispersant; and a copper phthalocyanine synergist having a carboxylic acid group thereon of the formula:

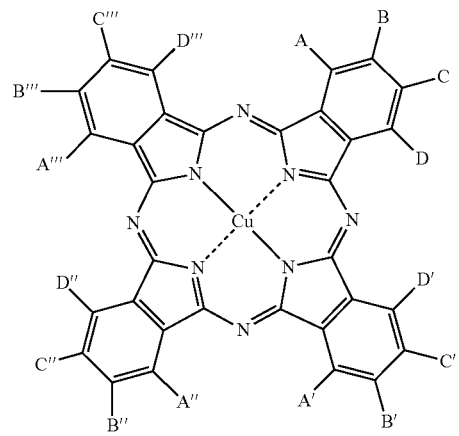

wherein each of A, B, C, and D, A', B', C', and D', A", B", C", and D", A'", B'", C'", and D'" are optionally present, provided that at least one of A, B, C, D, A', B', C', D', A", B", C", D", A'", B'", C'", and D'" is —COOH or R—COOH, and wherein each of A, B, C, and D, A', B', C', and D', A", B", C", and D", A'", B'", C'", and D'" are independently selected from the group consisting of hydrogen, —COOH and R—COOH wherein R is (i) an alkyl group, which can be linear or branched, saturated or unsaturated, cyclic or acyclic, substituted or unsubstituted alkyl, and wherein hetero atoms may optionally be present in the alky group, (ii) an aryl group, which can be substituted or unsubstituted aryl, and wherein hetero atoms may optionally be present in the aryl group, (iii) an arylalkyl group, which can be substituted or unsubstituted arylalkyl, wherein the alkyl portion of the arylalkyl can be linear or branched, saturated or unsaturated, cyclic or acyclic, and substituted or unsubstituted, and wherein hetero atoms may optionally be present in either the aryl portion or the alkyl portion of the arylalkyl, (iv) an alkylaryl group, which can be substituted or unsubstituted alkylaryl, wherein the alkyl portion of the alkylaryl can be linear or branched, saturated or unsaturated, cyclic or acyclic, and substituted or unsubstituted, and wherein hetero atoms may optionally be present in either the alkyl portion or the aryl portion of the alkylaryl group;

melting the ink composition; and causing droplets of the melted ink to be ejected in an imagewise pattern onto a substrate.

14. The method of claim 13, wherein the copper phthalocyanine synergist is of the formula

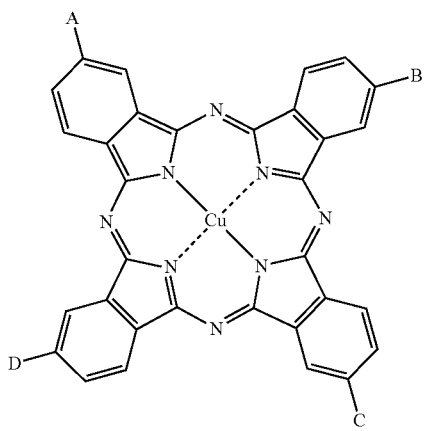

wherein A, B, C, and D are optionally present, provided that at least one of A, B, C, and D are present, and wherein A, B, C, and D are of the formula

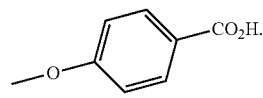

15. An ink jet printer stick or pellet containing a phase change ink composition comprising a pigment, a carrier; a dispersant; and a copper phthalocyanine synergist having a carboxylic acid group thereon of the formula:

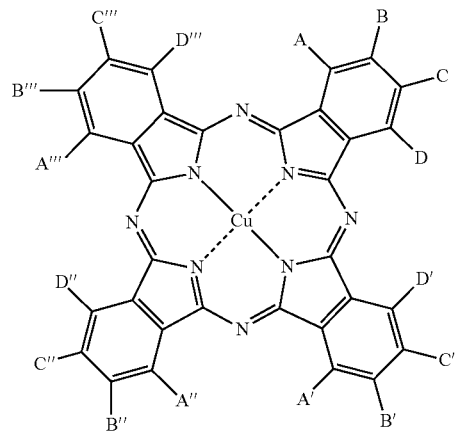

wherein each of A, B, C, and D, A', B', C', and D', A", B", C", and D", A'", B'", C'", and D'" are optionally present, provided that at least one of A, B, C, D, A', B', C', D', A", B", C", D", A'", B'", C'", and D'" is —COOH or R—COOH, and wherein each of A, B, C, and D, A', B', C', and D', A", B", C", and D", A'", B'", C'", and D'" are independently selected from the group consisting of hydrogen, —COOH and R—COOH wherein R is (i) an alkyl group, which can be linear or branched, saturated or unsaturated, cyclic or acyclic, substituted or unsubstituted alkyl, and wherein hetero atoms may optionally be present in the alky group, (ii) an aryl group, which can be substituted or unsubstituted aryl, and wherein hetero atoms may optionally be present in the aryl group, (iii) an arylalkyl group, which can be substituted or unsubstituted arylalkyl, wherein the alkyl portion of the arylalkyl can be linear or branched, saturated or unsaturated, cyclic or acyclic, and substituted or unsubstituted, and wherein hetero atoms may optionally be present in either the aryl portion or the alkyl portion of the arylalkyl, (iv) an alkylaryl group, which can be substituted or unsubstituted alkylaryl, wherein the alkyl portion of the alkylaryl can be linear or branched, saturated or unsaturated, cyclic or acyclic, and substituted or unsubstituted, and wherein hetero atoms may optionally be present in either the alkyl portion or the aryl portion of the alkylaryl group.

16. The ink jet printer stick or pellet of claim 15, wherein the copper phthalocyanine synergist is of the formula

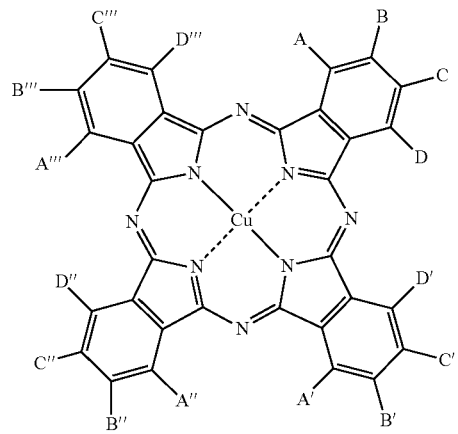

wherein each of A, B, C, and D, A', B', C', and D', A", B", C", and D", A''', B''', C''', and D''' are optionally present, provided that at least one of A, B, C, D, A', B', C', D', A", B", C", D", A''', B''', C''', and D''' is —COOH or R—COOH, and wherein each of A, B, C, and D, A', B', C', and D', A", B", C", and D", A''', B''', C''', and D''' are independently selected from the group consisting of hydrogen, —COOH and R—COOH wherein R is (i) an alkyl group, which can be linear or branched, saturated or unsaturated, cyclic or acyclic, substituted or unsubstituted alkyl, and wherein hetero atoms may optionally be present in the alky group, (ii) an aryl group, which can be substituted or unsubstituted aryl, and wherein hetero atoms may optionally be present in the aryl group, (iii) an arylalkyl group, which can be substituted or unsubstituted arylalkyl, wherein the alkyl portion of the arylalkyl can be linear or branched, saturated or unsaturated, cyclic or acyclic, and substituted or unsubstituted, and wherein hetero atoms may optionally be present in either the aryl portion or the alkyl portion of the arylalkyl, (iv) an alkylaryl group, which can be substituted or unsubstituted alkylaryl, wherein the alkyl portion of the alkylaryl can be linear or branched, saturated or unsaturated, cyclic or acyclic, and substituted or unsubstituted, and wherein hetero atoms may optionally be present in either the alkyl portion or the aryl portion of the alkylaryl group.

* * * * *